US010702768B1

(12) United States Patent
Lotzer

(10) Patent No.: US 10,702,768 B1
(45) Date of Patent: *Jul. 7, 2020

(54) ADVANCED GAMEPLAY SYSTEM

(71) Applicant: OPEN INVENTION NETWORK LLC, Durham, NC (US)

(72) Inventor: Carey Leigh Lotzer, Sachse, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,404

(22) Filed: Jun. 25, 2019

Related U.S. Application Data

(63) Continuation of application No. 15/694,935, filed on Sep. 4, 2017, now Pat. No. 10,328,338, which is a
(Continued)

(51) Int. Cl.
| | |
|---|---|
| *H04N 13/04* | (2006.01) |
| *G06F 3/01* | (2006.01) |
| *A63F 13/20* | (2014.01) |
| *H04N 13/366* | (2018.01) |
| *A63F 13/40* | (2014.01) |
| *A63F 13/25* | (2014.01) |
| *H04N 9/31* | (2006.01) |
| *A63F 13/27* | (2014.01) |
| *H04L 12/64* | (2006.01) |
| *A63F 13/67* | (2014.01) |
| *A63F 13/213* | (2014.01) |
| *A63F 13/837* | (2014.01) |
| *A63F 13/90* | (2014.01) |
| *A63F 13/428* | (2014.01) |
| *G06T 13/40* | (2011.01) |

(Continued)

(52) U.S. Cl.
CPC ............ *A63F 13/20* (2014.09); *A63F 13/213* (2014.09); *A63F 13/25* (2014.09); *A63F 13/27* (2014.09); *A63F 13/40* (2014.09); *A63F 13/428* (2014.09); *A63F 13/67* (2014.09); *A63F 13/837* (2014.09); *A63F 13/90* (2014.09); *G06F 3/017* (2013.01); *G06T 13/40* (2013.01); *H04L 12/6418* (2013.01); *H04N 9/3147* (2013.01); *H04N 9/3185* (2013.01); *H04N 13/366* (2018.05); *G03B 33/08* (2013.01); *G03B 37/04* (2013.01)

(58) Field of Classification Search
CPC ........... G06F 3/01; G06F 3/017; G03B 33/08; H04N 13/0468
See application file for complete search history.

(56) References Cited

U.S. PATENT DOCUMENTS

| | | |
|---|---|---|
| 5,502,481 A | 3/1996 | Dentinger et al. |
| 5,602,978 A | 2/1997 | Lastinger |

(Continued)

*Primary Examiner* — Ryan D Howard

(57) ABSTRACT

The present invention enhances the player's gameplay visual, feedback and other experiences by taking advantage of optical adapters, feedback mechanics, advancements in theatrical audio, frame rate throttle, meta-file object framework for storage and retrieval, calibration advancements, vocal command enhancements, voice object lookups, facial/body scan, color/clothing coordination, party or celebration capabilities, noise cancellation, interactive object placement, heart rate monitor, pan-tilt-zoom camera advances, cooperative gameplay advances and programming advancements.

20 Claims, 21 Drawing Sheets

Related U.S. Application Data continuation of application No. 13/922,334, filed on Jun. 20, 2013, now Pat. No. 9,751,004, which is a continuation of application No. 13/159,514, filed on Jun. 14, 2011, now Pat. No. 9,060,136.

(60) Provisional application No. 61/354,312, filed on Jun. 14, 2010.

(51) Int. Cl.
*G03B 33/08* (2006.01)
*G03B 37/04* (2006.01)

(56) References Cited

U.S. PATENT DOCUMENTS

| | | |
|---|---|---|
| 5,961,195 A | 10/1999 | Yoshimatsu et al. |
| 6,034,717 A | 3/2000 | Dentinger et al. |
| 6,317,171 B1 | 11/2001 | Dewald |
| 6,327,020 B1 | 12/2001 | Iwata |
| 7,997,734 B2 | 8/2011 | Mochizuki et al. |
| 8,870,379 B2 | 10/2014 | Choi |
| 9,060,136 B1 | 6/2015 | Lotzer |
| 9,137,548 B2 | 9/2015 | Li et al. |
| 9,542,002 B1 | 1/2017 | Lotzer |
| 9,751,004 B1 * | 9/2017 | Lotzer ............... H04N 9/3147 |
| 10,328,338 B1 * | 6/2019 | Lotzer ............... H04N 9/3147 |
| 2007/0008503 A1 | 1/2007 | Choi |
| 2007/0146652 A1 | 6/2007 | Peterson et al. |
| 2008/0204672 A1 | 8/2008 | Ikeda et al. |
| 2009/0318228 A1 | 12/2009 | Hughes |
| 2010/0026624 A1 | 2/2010 | Bell |
| 2010/0199230 A1 | 8/2010 | Latta et al. |
| 2010/0211431 A1 | 8/2010 | Lutnick et al. |
| 2011/0007079 A1 | 1/2011 | Perez et al. |

* cited by examiner

ADVANCED GAMEPLAY SYSTEM

FIELD OF THE INVENTION

The present invention is related to mechanical and software enhancements made in developing a gameplay system based on a controller-less environment, particularly in the use of multiple hardware feedback and control components, optics and object-based development processes characterized in the context of a perceptual field of view. Software advancements are made in the areas of motion detection and modeling as well as image, audio and video storage and retrieval formats.

Concurrent art related to the current invention describes specific hardware apparatuses used to produce a gameplay environment based on the perceptual field of view as well as feedback mechanisms utilizing programmable interfaces to compressed air modules. The current invention describes processes used to enable the components which make up the perceptual angle of view model. Through this enablement, the current invention provides a mechanism to enhance the player's experience by providing the ability to immerse the player in an expanded view angle and series of feedback mechanisms.

BACKGROUND OF THE INVENTION

Current console-based gameplay systems provide several hardware and software components which are enumerated here:

Controller units—one or more hand-held game controller units used to control a character or other object in a game. The controller is used to send signals and commands to the game console. These commands, in turn, are translated into commands sent to the game. Example commands include object movement and actions such as shooting, strumming, jumping, swimming, punching, kicking, skiing, balancing, running, etc. In addition to these, commands are sent to the console using the controller to make game selections, retrieve statistics, save games, load games, choose clothing, body and face settings, etc. In some cases, controller units can be used to receive feedback from the console based on gameplay which includes vibration and audio signals as a means to enhance the player's experience.

Console unit—a device used to read the game software as well as read the commands from one or more controllers, display the game on a screen. Current media systems receive the video and audio signals from the gameplay console and deliver them to their respective devices such as video projection systems, video screens and one or more speakers.

Camera unit—a device which is not required, but provides additional feedback to the console unit as well as adding the ability for a player to personalize the game they are playing.

Game software—a software program which displays game objects to the player through the console and to the display device, sends audio signals to the audio device as well as interfacing with the player through the controller. In cases of warning a player, for example, an audio and vibrating signal can be sent to the controller when their character is being hit. The software, in this case, may also use some visual on-screen indicator to further warn the player. In this instance, the player could use the controller to turn the character in the direction of the opponent, and apply a particular action to ward off the opponent. This requires movement of the fingers and eyes to move the character in the direction of the opponent and fend them off.

Video, image and audio storage formats—the binary organization of audio and image data forms the proprietary format of the files used for playback and storage.

Touch-screen gameplay—much like the controller-less gameplay, using the hands or fingers, gameplay is controlled by manually manipulating icons and avatars on a touch screen.

Controller-less gameplay—the ability to play a game without a controller at all where the controller is based on the hand, arm, leg and body movements made by one or more players. Motion detection equipment of the instant invention converts motion, hand and facial signals, including eye movement, into the characteristic movements and actions of an object within a game. This is referred to as a controller-less gameplay environment.

SUMMARY OF THE INVENTION

Current gameplay systems are devoid in the manner of expanded view angle and certain feedback mechanisms which naturally express themselves in a controller-less gameplay environment. A perceptual field of view can be constructed using an array of one or more flat screens, projector screens or the walls of a media room using a peripheral angle of view projection adapter. FIG. 1 and FIG. 2 show side and top representations of the view angle provided to the player using a state-of-the-art projector and screen combination. In this example, the top view angle provided is approximately 25 degrees. This is a very limited experience to the player and requires little action on the player's part to interact with the game.

The present invention employs a method of utilizing a perceived angle of view by providing a programming environment for one or more air cannons, motion sensors, audio centers, video tracking devices, and multidimensional screens. This expands the depth and dimensions of the gameplay arena by utilizing a perceptual field of view model (PFVM) within a controller-less gameplay environment, feedback mechanisms, such as compressed air cannons, microphone, speakers and independent screen coordinates which are programmed outside of the normal range of traditional game programming. This requires a calibrated system where relative world coordinate systems could mesh with gameplay coordinate systems beyond a single screen. Eye, hand and body motion tracking devices could be used as well as devices which process audio commands and logic devices capable of negotiating command gestures based on signals and projected angles of response. In the case of a multidimensional tracking environment, these projected command gestures and controls could be responded to over a network of camera and motion tracking devices programmed to respond in a unified manner.

Beyond the use of audio commands, an embodiment of the current invention has the ability to detect and interpret specific body and hand motions to interact with the game system either by issuing one or more commands, making system changes, or retrieving one or more items out of the system's storage unit that the avatar within the game may use or perform associated actions.

The perceptual field of view model is based on measurements made of an average human field of view. FIG. 3, FIG. 4, and FIG. 5 represent the average human field of view from the back, front and top, respectively. The fields of view from the top and side vantage points are approximately 120 degrees. Even if a camera system is set to a 45 degree field of view, this limits the gameplay environment to more than half of the available field of view of real world exposure which could be experienced by the average human player.

Because of the advancements of the current invention, there are several meaningful directions which can be taken. Taking the concept further, a preferred embodiment of the current invention may involve a series of single and multiple (present or not) player combinations, several advancements in optical and computer-aided technologies for the purpose of making gameplay more realistic without the use of a controller, as well as a series of devices used for character interaction, control, feedback and for the purpose of enhancing the perception of the one or more subjects during the gameplay experience while maintaining a low-level of cost and complexity for the user or manufacturer.

These include the following:

Optical adapter—a portion of the current invention is the use of an optical adapter which enhances the visual perception of the player FIG. 6 and FIG. 7. This adapter could fit over a standard video projection lens and could extend the projected space above, below and out the sides of the player's peripheral video. The result of the advancements in the optical system is shown in FIG. 8 and FIG. 9 where the screen surrounds the player in either the front and sides or the front, sides and overhead. Current games, such as first person shooters, limit the player to a flat screen and have no way of satisfying the player's peripheral angle of vision. When a player looks around them, they want to see their environment all around them—not the edges of a screen. Without using equipment attached to the player's body, an advanced optical projection technology can be used as described below. In other embodiments, additional equipment can be used to support such functionality as further described below.

Feedback advancements—current games provide visual indicators to the player when they are being hit. This is generally accompanied by the controller vibrating. In the current invention, instead of turning the player's avatar in the direction of the visual indicator, the player could turn to the left or the right (above, below or behind them) in the direction of the attacker. This further eliminates the need for a controller, but follows the player's (one or more) motion(s) as shown in FIG. 10. Overhead attackers or opponents could be situated on gantries, in air planes, buildings, flying overhead or towering above them. The player could turn in the direction of the opponent(s), and in the case of a shooting match, could fire his weapon in the direction of the opponent (height and direction). When the player turns their body, their ability to fire at an attacker is extended well beyond the flat screen but off to the side, above or behind them. In addition to this, without the vibrating feedback from the controller, a small, but silent, compressed air signal can be released to further indicate the location of the attacker. In this manner, the player is immersed in a true 3-dimensional arena at a very low cost.

Motion dictates system action—the system receives a sequence of motion images which result in a lookup into the system's storage unit within the context of the game being played and results in a command delivered to the game system, producing a change, such as an object appearing in the avatar's hands or an action, such as super-strength being used. An example of this is shown in FIG. 11 where a boy is shown making a motion as if holding a bazooka, and FIG. 12 shows the corresponding result on the screen in the game where the boy's avatar is holding a bazooka and pointing it in the same direction the boy is pointing.

Theatrical audio—multiple speakers could be programmed to further enhance the one or more players' experiences. For example, if an attacker appears to the left side of the one or more players, the speakers on the left side of the room could be used to produce a sound which could warn the one or more players. They could react to the sound by turning to the left to face the attacker.

Frame rate throttle—synchronizing multiple cameras and increasing the video capture frame rate based on a particular gameplay in a peripheral view model is described. For example, if a player has intricate moves which need to be captured, the single or multiple cameras can be programmed by the game software to increase the frame capture to real-time. Normal game movements can be captured using normal frame rate.

Meta-file object framework—a media framework file format of the instant invention is used to contain the media data and other objects to form a robust architecture necessary to deliver the streaming data and communication protocols necessary for the multi-dimensional video, audio, image and non-media data as shown in FIG. 13.

Calibration advancements—green screen measurement in 3D can be used to calibrate the peripheral view. This insures that the tracking system, targeting system, one or more player positions and the angles which the one or more players respond to targets are aligned in the three-dimensional model.

Vocal command enhancements—voice recognition is used to command the unit to retrieve game statistics and system or game configurations from the system's storage unit for a given game or collection of games.

Voice object lookups—voice recognition and a storage unit object dictionary is used to announce additional scene objects such as a bat (physical or on the screen).

Facial/body scan—the camera capture unit has the ability to scan the face and/or body of the player into the game for full immersion. The digitized player acts as the game avatar.

Color/clothing coordination—the unit also has the ability to determine the type and color of the clothing used by the player and can correspondingly produce the same styles and colors on the screen with the player's avatar. In addition, different teams can have coordinating attire regardless of their location. For example, a certain jersey can be used in a cooperative sport and appears on the screen for all players on that team.

Party or celebration—players can add elements onto a screen which they can configure to coordinate with their party or celebration items. For example, if they have a room with balloons, cake and other party decorations, the system can either shoot the room as a mirror image or extend the appearance of the room by adding coordinating objects in the virtual room.

Noise cancellation—there are times which noise from the feedback system needs to be ignored by the command receiver. This is done by providing noise cancellation logic in the system when the feedback system is being used.

Interactive object placement—the player has the ability to announce the existence of additional objects and place them in a particular position on the screen by pointing at the object and then the place where the player wants the object positioned and oriented.

Heart rate monitor—a heart rate monitor will be used to measure the player's heart rate. This can be used to slow a particular game down or speed it up to maintain a particular heart rate. This can also be used to measure the approximate number of calories being burned.

Pan-tilt-zoom advances—capabilities of the camera to follow player motion during gameplay will include the pan-tilt-zoom controls capable by the camera. Advances in this area will be used to enable new game experiences.

Cooperative gameplay advances—multiple players, either local or over a network, interact with each other based on a given relationship to each other in either the same room or another room across the network.

Programming advancements—games could be written to make use of the advancements in the hardware. This could include the multiple screens, the one or more motion and feedback systems, the camera frame rate throttle, the optical augmentation apparatus, the theatrical audio system, motion simulation and extension, motion translation to commands, motion translation to adding and removing objects in the game, as well as cooperative and other multi-player aspects of a game.

Time-to-rest notification—either by determining that the person has been playing too long by a timer, an average score keeping element or parental control, the game system can either remind the player that they have been playing too long, need a rest and allow the player to save their progress, or halt the game completely for a given rest period.

DETAILED DESCRIPTION OF THE INVENTION

Figure 1:
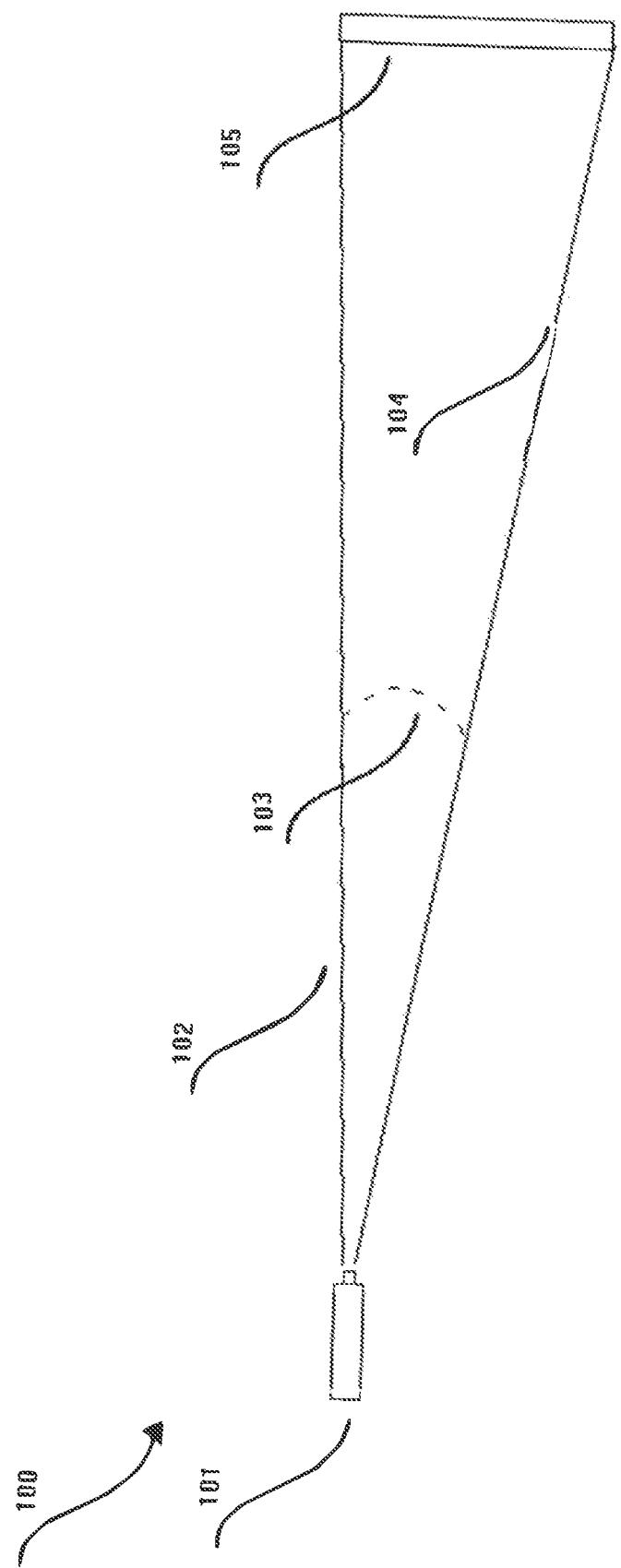
FIG. 1 shows an overhead-mounted projector illuminating an image on a projection screen.

Referring to FIG. 1, a projector 101 (used in a conventional system 100, not fully shown) sends a projected image having an upper bound 102 and a lower bound 104 described by a vertical angle of view 103 to a receiving screen 105. The arc of the angle of view 103 varies with the settings within the projector limited by the candle output and lens construction. This is an example of the limited height of the field of view presented using a projector in a modern system. Overhead-mounted projection allows the player to position themselves under the projection path without producing a shadow on the projection screen.

Figure 2:
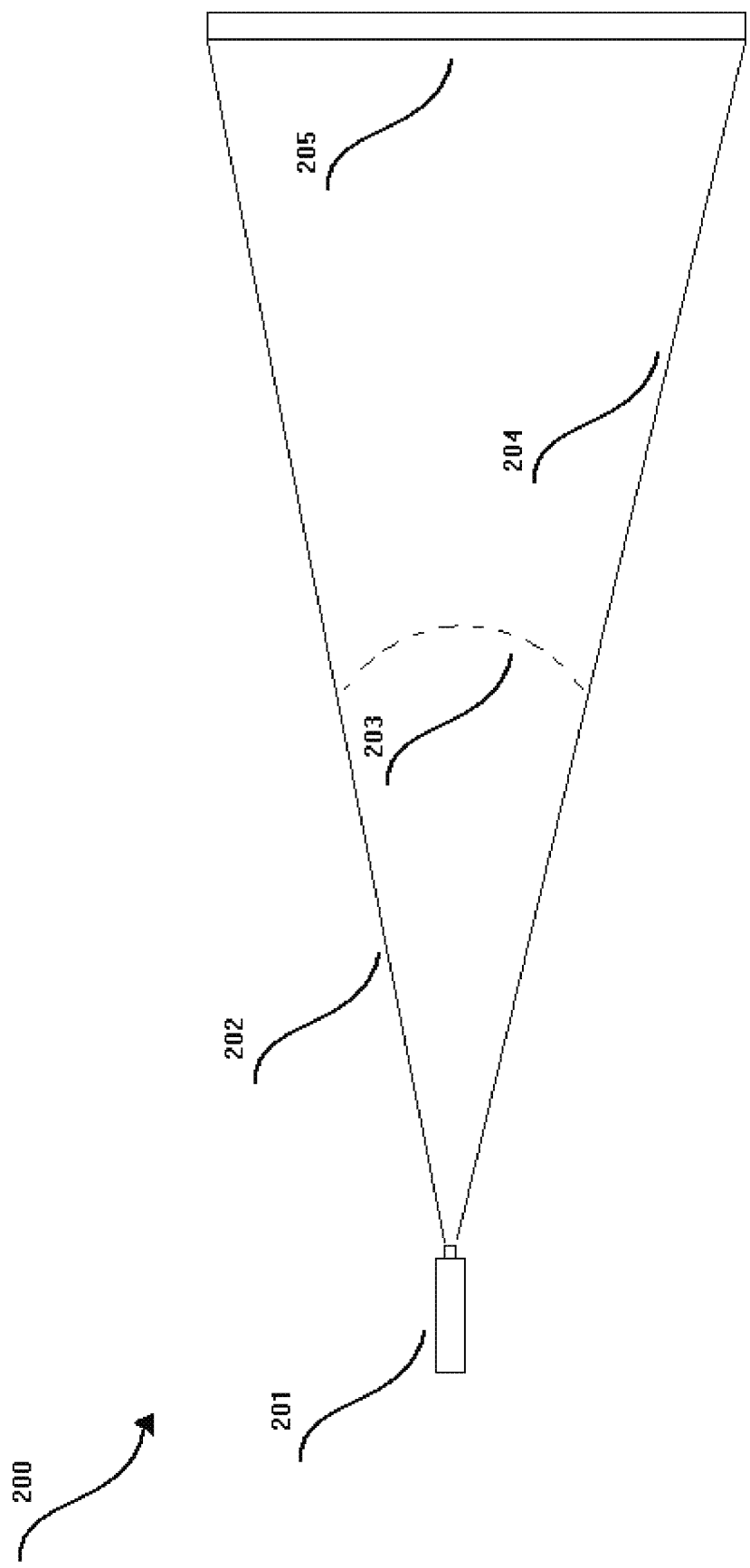
FIG. 2 shows an overhead-mounted projector illuminating an image on a projection screen.

Referring now to FIG. 2, the projector 201 (used in a conventional system 200, not fully shown) sends a projected image having an left bound 202 and a right bound 204 described by a horizontal angle of view 203 to a receiving screen 205. The arc of the angle of view 203 varies with the settings within the project limited by the candle output and lens construction. This is an example of the limited width of the field of view presented using a projector in a modern system. Overhead-mounted projection allows the player to position themselves under the projection path without producing a shadow on the projection screen.

Figure 3:
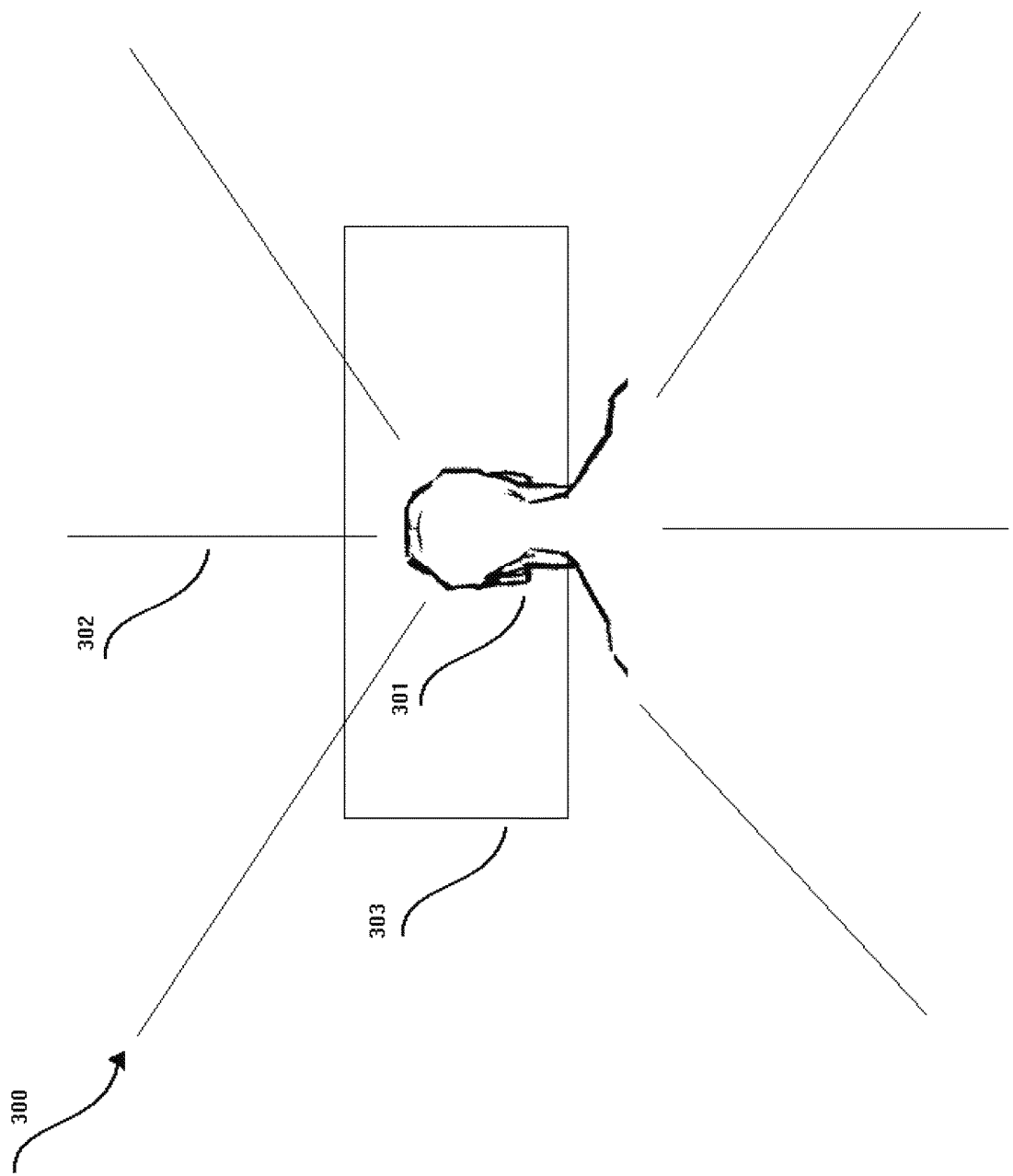
FIG. 3 represents the average human field of view from the back where the width and height is approximately 120 degrees.

Referring now to FIG. 3, a player has the ability to view a much wider and higher angle of view than most projection systems output. A player 301 has the ability to view an upward vertical area 302, for example, without moving the head 301, seeing well beyond the border 303 of a regular display screen (used in a system 300 of the instant invention, not fully shown).

Figure 4:
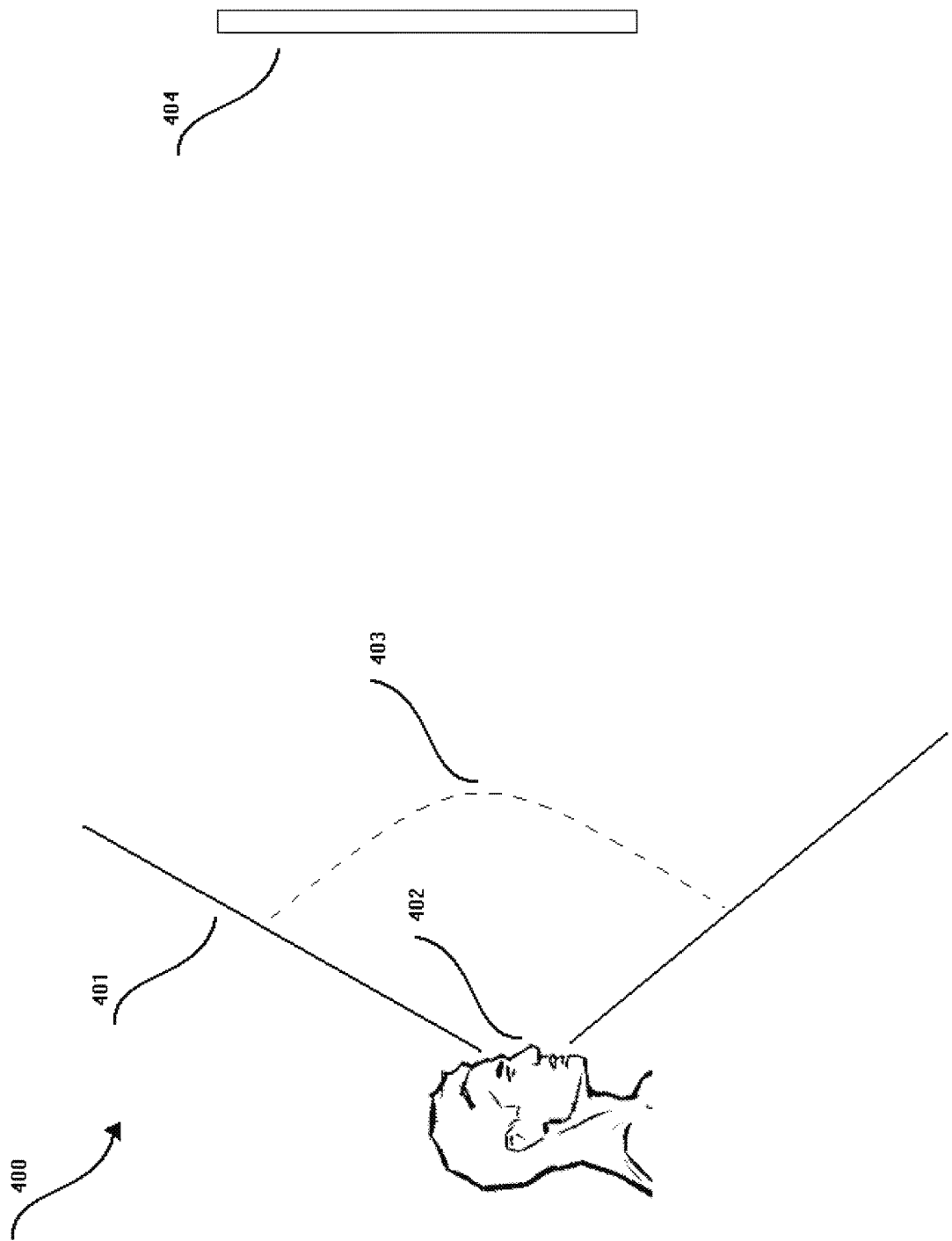
FIG. 4 represents the average human field of view from the side where the height is approximately 120 degrees.

Referring now to FIG. 4, a player 402 has the ability to view an upward vertical area 401 and a corresponding lower area described by an angle 403 which is much greater than the height of a given screen 404 (used in a system 400 of the instant invention, not fully shown).

Figure 5:
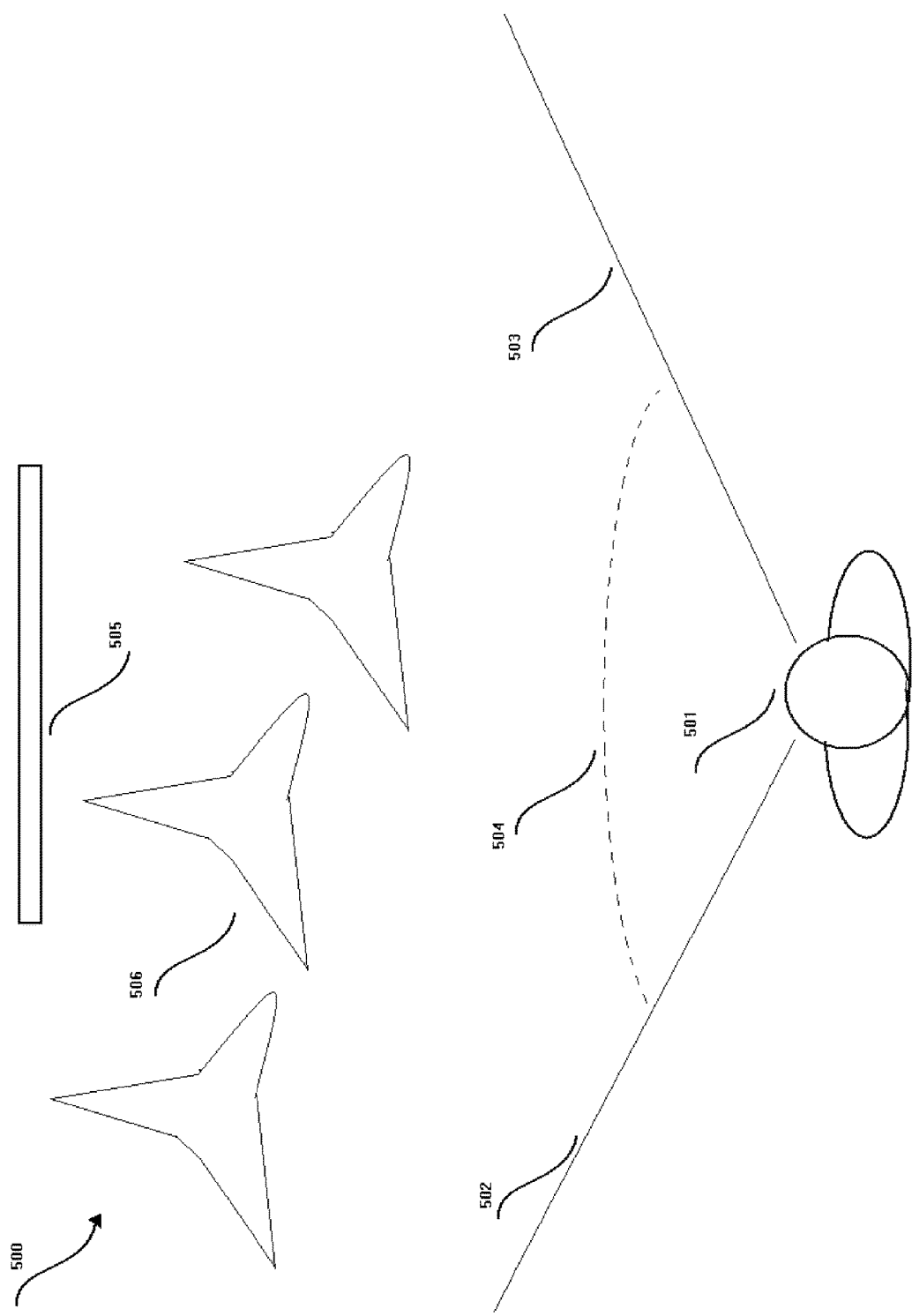
FIG. 5 represents the average human field of view from the top where the width is approximately 120 degrees.

Referring now to FIG. 5, a player 501 has the ability to view an left horizontal area 502 and a right horizontal area 503 described by an angle 504 which is much greater than the width of the screen 505. This gives the player 501 the ability to have sight of, for example, opponents overhead, to the front and/or to the sides 506, for example, which cannot be displayed on screen 505 (used in a system 500 of the instant invention, not fully shown).

Figure 6:
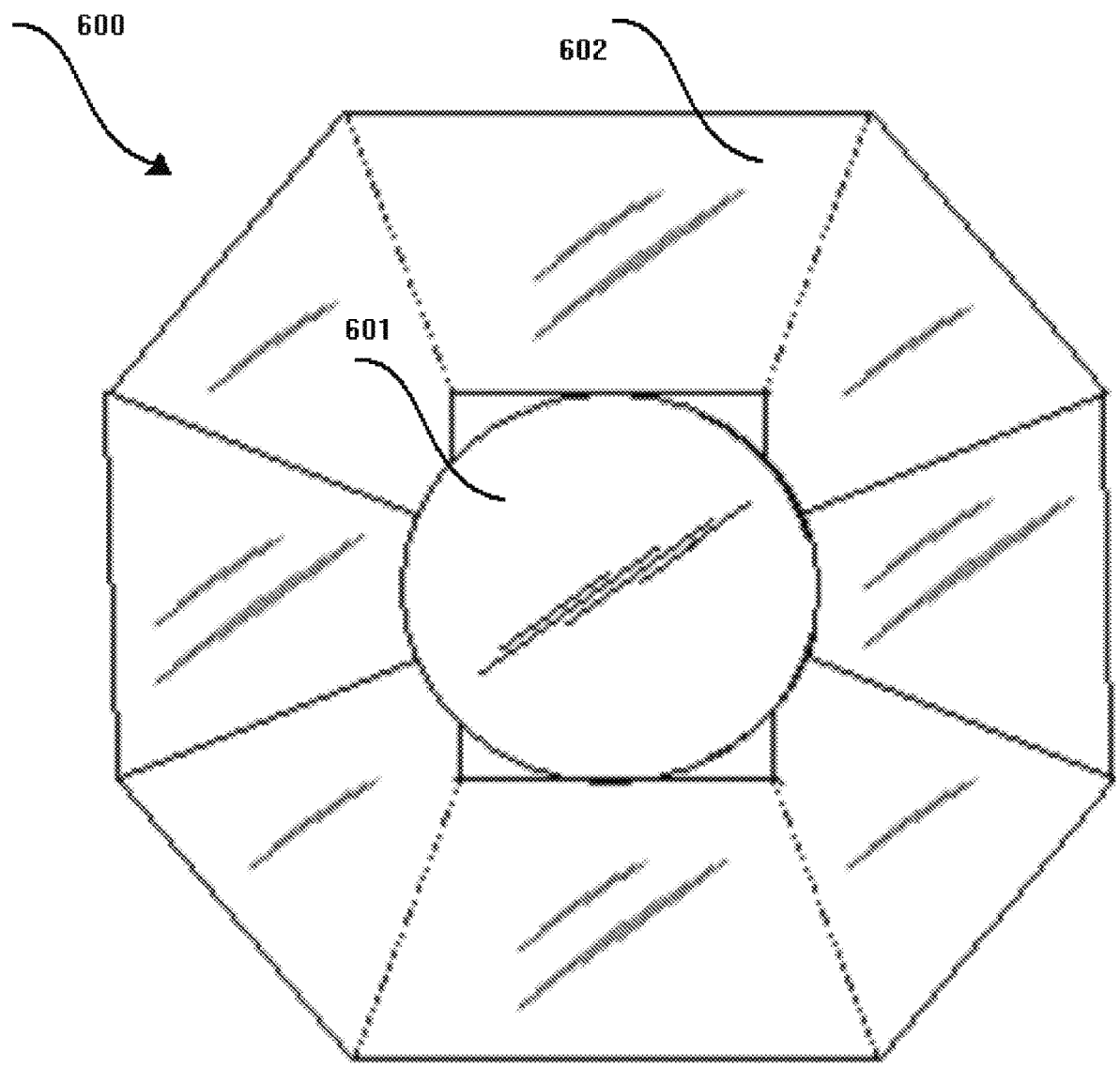
FIG. 6 shows the projection adapter core shown from the front.

Referring now to FIG. 6, the sending component of the current invention where light and image data for the purpose of projection are transmitted through a lens adapter 601 (which may be an optical adapter) and multiple facets 602. These facets 602, which can be constructed of glass, mirrors, plastic, metal, and the like, are responsible for projecting the video images onto a receiving screen at angles well beyond the modern projection capabilities (used in a system 600 of the instant invention, not fully shown).

Figure 7:
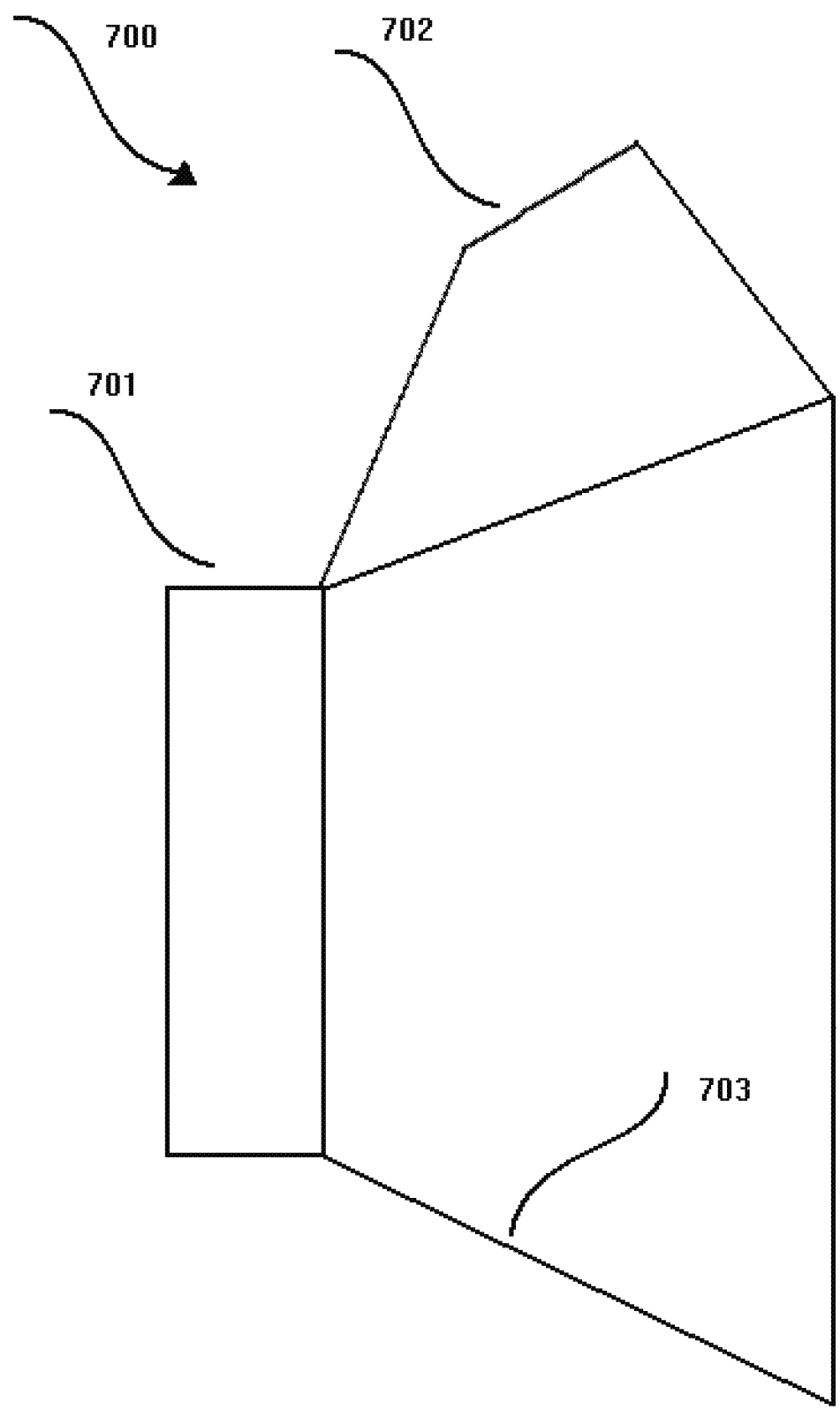
FIG. 7 shows the projection adapter core shown from the side.

Referring now to FIG. 7, the outer body of the projector video adapter 700 is shown. The adapter 700 is composed on a lens connector and lens filter 701 as well as an upper facet set 702 and a lower facet set 703 of the lens adapter 601. The upper facet 702 and lower facet 703 as well as right and left side facets emit a video signal using enhanced power adapters and increased lighting capability.

Figure 8:
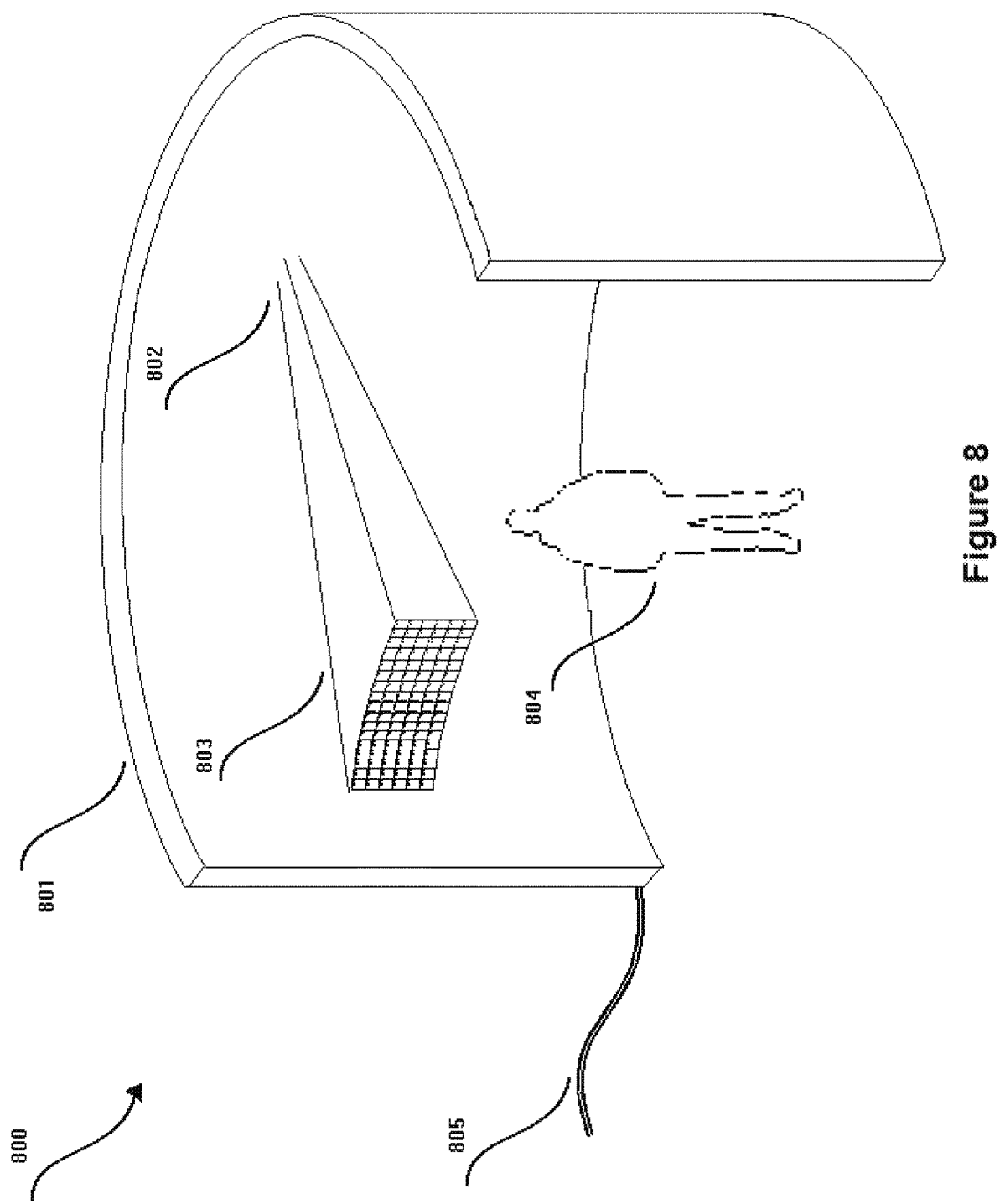
FIG. 8 shows an embodiment of the current invention display unit with a player standing in the system as well as showing the pixel detail of the screen.

Referring now to FIG. 8, an alternate embodiment of the current invention shows a half-circular screen 801 with a player 804 standing inside of the screen 801. The walls of the screen 801 are around the player 804 so that the game surrounds the player 804 from all sides. Details of the pixels 802 which make up the screen 801 are shown as 803. The electrical and video connections between the screen 801 and an instant system (not fully shown) are shown in 805. In this embodiment, the lens adapter and projector may not be used (used in a system 800 of the instant invention, not fully shown).

Figure 9:
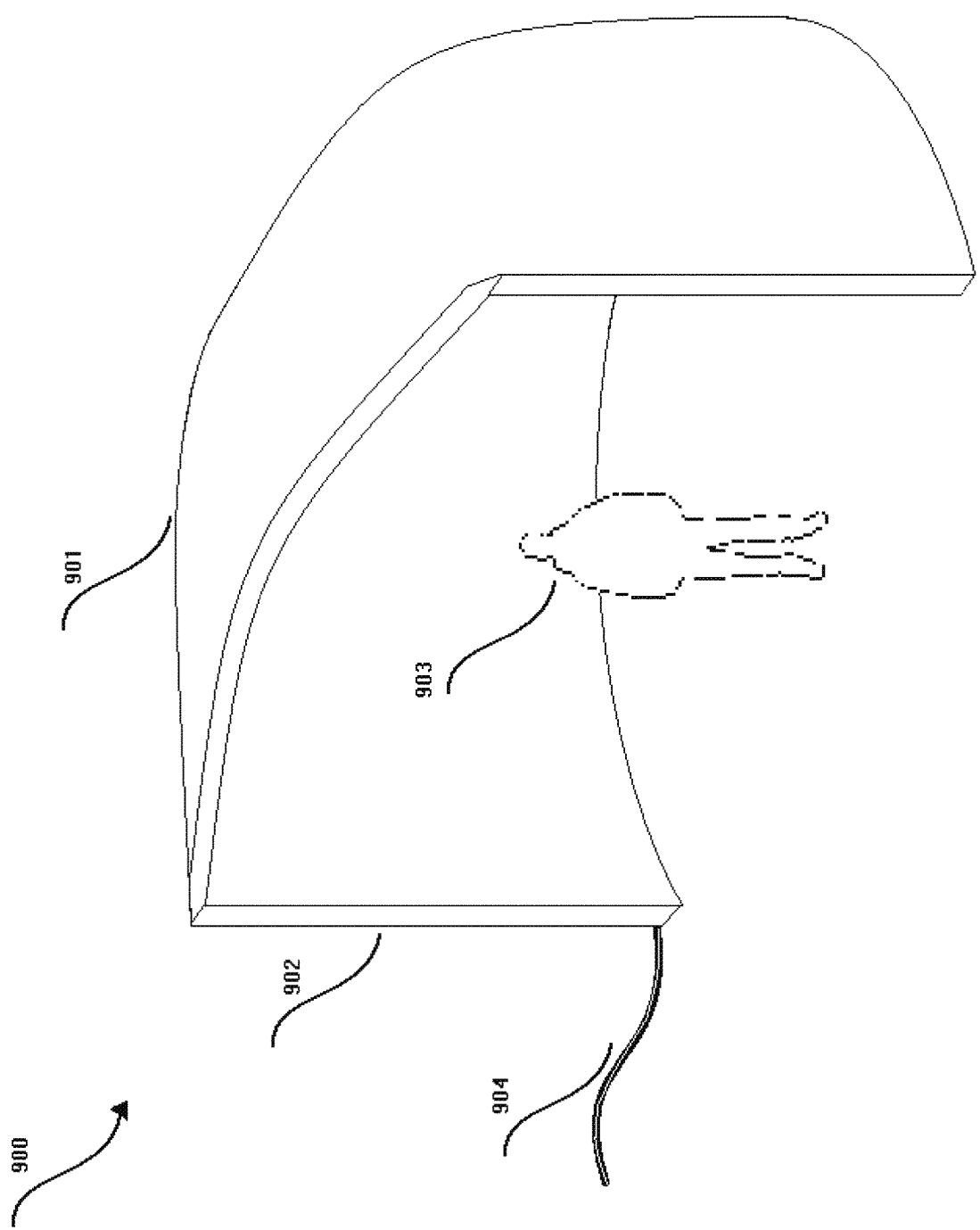
FIG. 9 shows an embodiment of the current invention display unit with a player standing in the system and the system having an upper screen situated over the player's head.

FIG. 9 shows another embodiment of the current invention where a screen 902 has a top screen 901 which covers the player 903 overhead and provides additional game interactivity. The screen 902 is connected to the instant system (not fully shown) and electricity represented by 904 (used in a system 900 of the instant invention, not fully shown).

Figure 10:
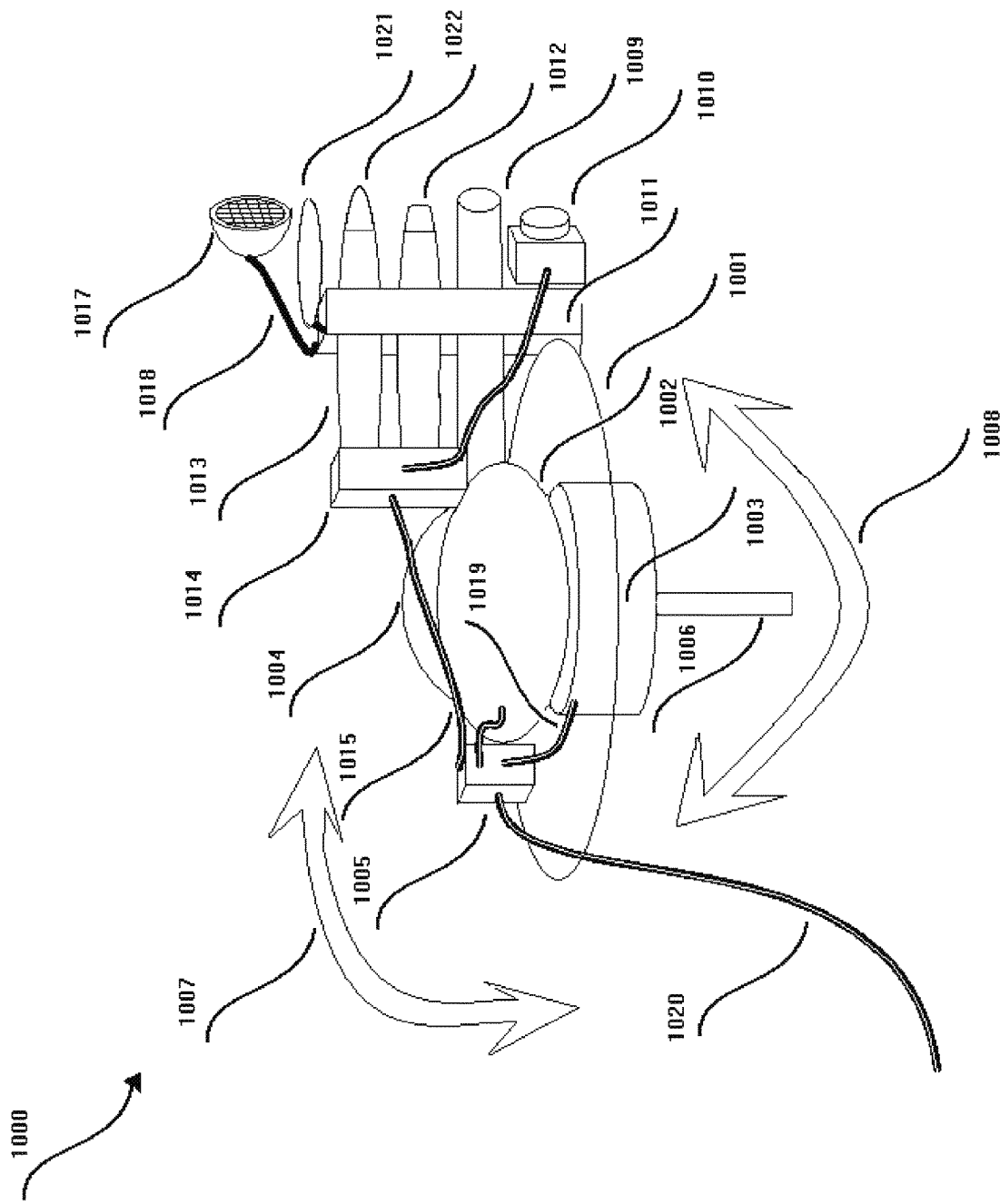
FIG. 10 represents a preferred embodiment of the current invention feedback system which includes a servo mechanism to provide up and down movement, a servo for side to side movement, an air chamber and air cannon for air blasts, a microphone, a speaker, a scent delivery system, a motion tracking module, and a camera.

Referring to FIG. 10, the unit 1000 rests on a moving platter 1001 which is positioned by a vertical servo 1004 providing vertical motion 1007 and a horizontal servo 1003 providing horizontal motion 1008 used to track the movements of one or more players using a motion detector 1022 and camera 1010 tethered by a control wire 1011. The motion detector 1022 is held in a casing 1013 which is connected to a motor 1014, providing feedback to the servo motor 1005 through a control wire 1015. The servo motor 1005 sends and receives position signals to and from the vertical servo 1004 and horizontal servo 1003.

A replaceable scent cartridge, also 1014, is connected to a scent emitter 1012 which can spray a various number of scents into the room. For example, if the player is experiencing a wooded area, an evergreen scent can be delivered based on program settings within the game.

The air cannon 1012 can also be programmed to release varying levels of compressed air based on a game experience. The air cannon 1012 is connected to the air chamber 1002 which is controlled by a computer chip inside of 1005.

The units described are supported by a mounting bracket 1011 which also supports the microphone 1021 and speaker 1017 and speaker wire 1018.

The unit rests on a mounting platform 1006 which can be connected to a wall, a table, the floor or a speaker in the room. Based on the power levels set within the system, it is best to have the unit mounted to a table or on a wall.

The unit is further connected to a computer for receiving program settings by a wire(s) 1020 that are attached to the instant system (not fully shown).

The current invention makes use of input devices such as one or more cameras and motion detection apparatuses to detect player movements which symbolize the addition or use of one or more devices within the context of a game.

Figure 11:
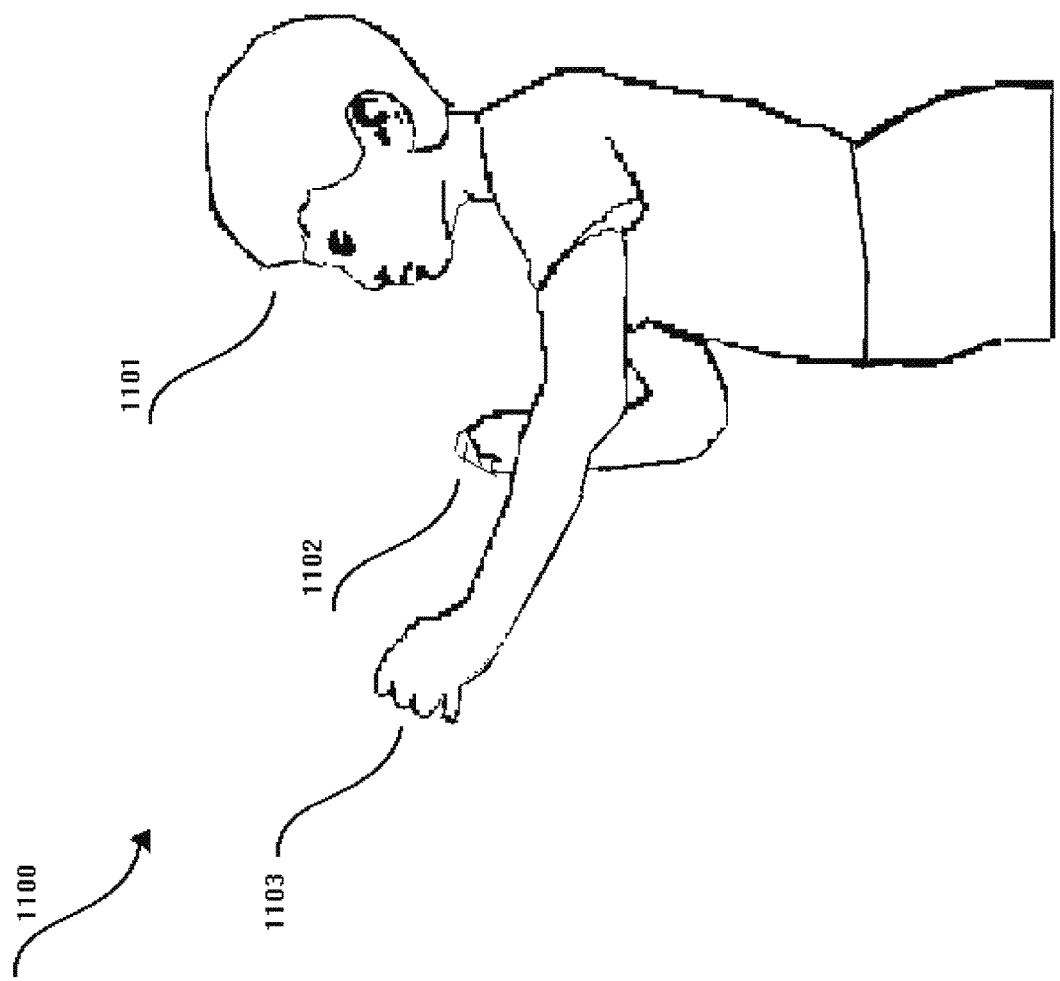
FIG. 11 shows a player holding a pretend bazooka in his hands.

Referring to FIG. 11, the player 1101 within a play area 1100 hoists and rests a pretend bazooka on his arm while holding the trigger 1102 and aiming the gun in a particular direction 1103. The bazooka has a handle at the base with a trigger and a handle at the nose used for aiming the unit at the given target.

Figure 12:
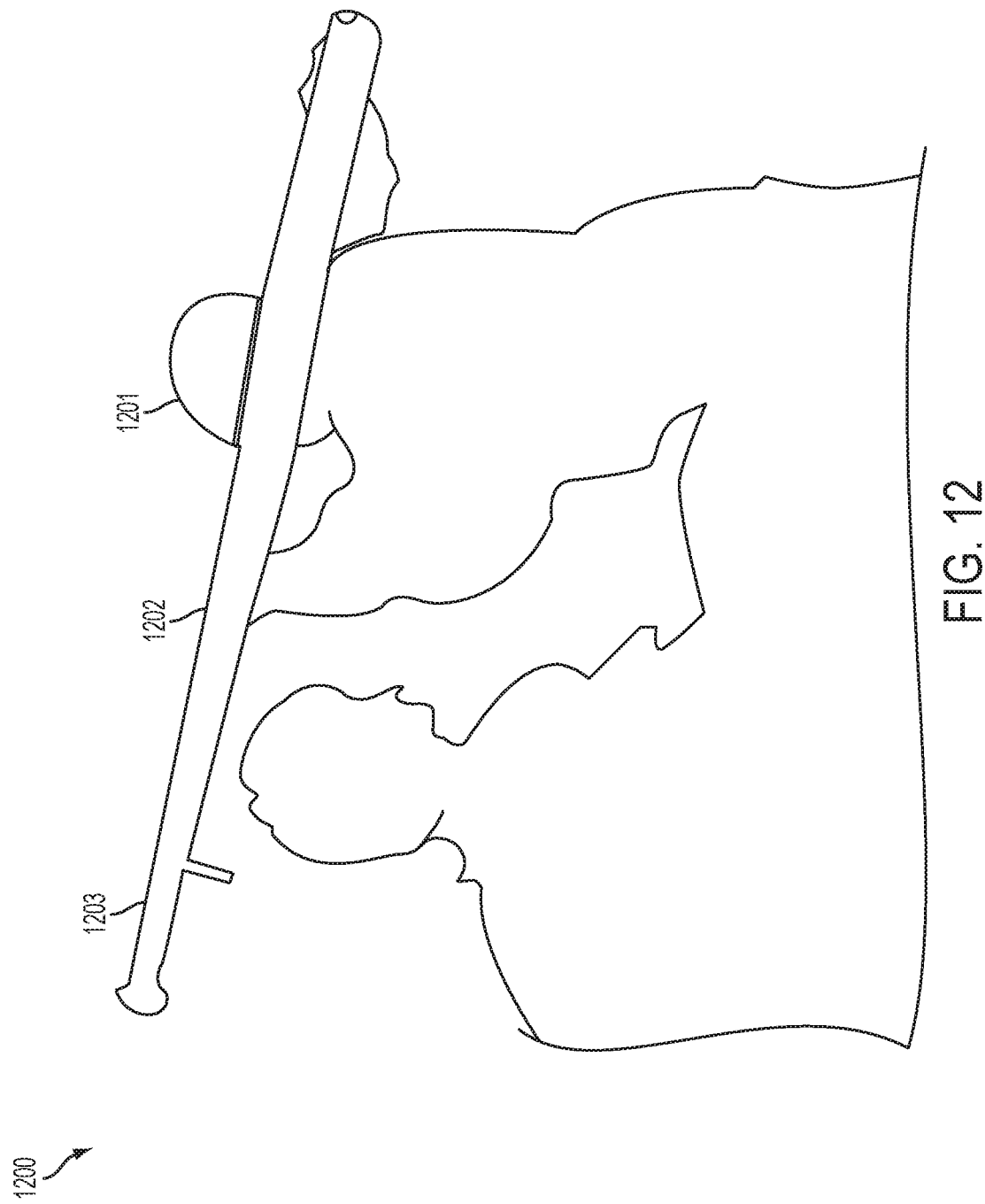
FIG. 12 represents the avatar corresponding to the player in FIG. 11 holding a bazooka and using it in the same manner as the player.

Referring now to FIG. 12, the game 1200 shows the player's avatar 1201 holding a realistic bazooka by the trigger 1202 and pointing the gun in the same direction 1203 which is determined by the player. The bazooka shows the two handles which are imitating the player's use of the unit.

Combining FIG. 11 and FIG. 12 in a gameplay environment shows the relationship of how the players' motions are interpreted on the screen as motion instructions for an avatar within the context of the given game in accordance with an embodiment of the instant application.

Figure 13:
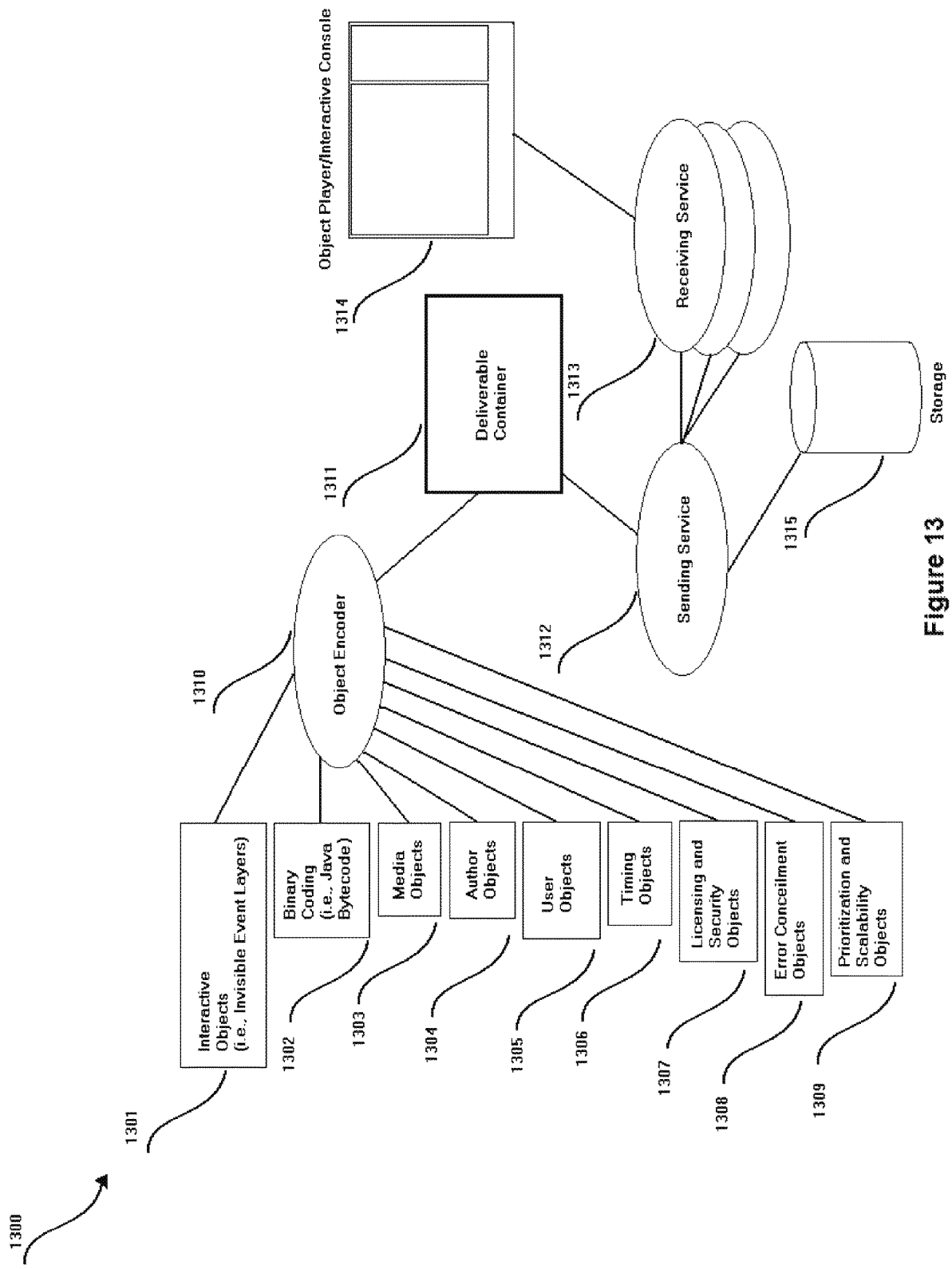
FIG. 13 represents the file format components and storage arrangement used to encode the video and meta-data components of the video game.

Referring now to FIG. 13, the example 1300 shows the operation of storing the gameplay file, transmitting the gameplay file, and representing it on the screen. The gameplay file encoder 1310 collects the interactive objects 1301, the binary codes 1302, the media objects 1303, the author objects 1304, the user objects 1305, timing objects 1306, licensing and security objects 1307, error concealment objects 1308 and prioritization and scalability objects 1309 into one file object 1311. This format provides the ability to store and retrieve the complex interactive media objects used for the game, game attributes, as well as other components used by the one or more players as well as the objects and actions used by the player and their effects within the game in accordance with an embodiment of the instant application.

The sending service 1312 sends the deliverable container 1311 to the one or more storage objects 1315 while the one or more receiving services 1313 receive a retrieved deliverable content 1311 from the one or more storage objects 1315 to one or more receiving player or interactive object/console 1314. In this manner, the content is shown to the user or player.

Figure 14:
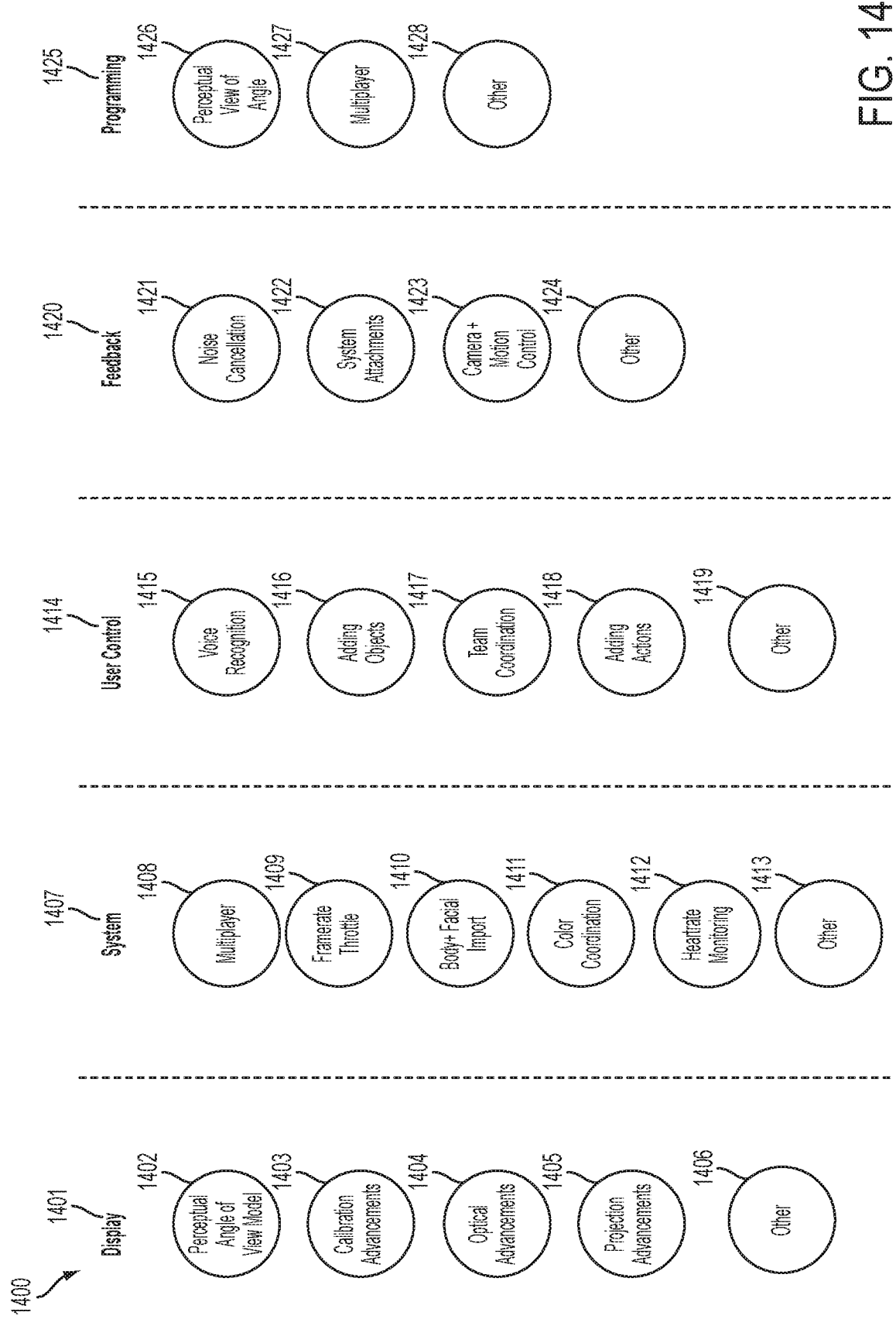
FIG. 14 represents the components of the current invention and their relationship to each other.

Referring now to FIG. 14, 1400 represents the components of the current invention and their relationship to each other. Under the display section 1401 of the current invention, the perceptual angle of view model 1402, calibration advancements 1403, optical advancements 1404, projection advancements 1405, and other functionality 1401 related to the display (such as touch-screen elements or borderless screen elements, and the like 1406) are noted and collected together in the display category 1401. Several other topics are shown under the system 1407, user controls 1414, feedback 1420 and programming 1425 component headings.

Related to the display category, is the system section 1407. The multi-player system aspects 1408, frame rate throttle 1409, body/facial scanning 1410, color coordination 1411 and heart rate monitoring 1412 elements of the system fall into this section. The system 1407 is a portion of the architecture of the game system and is located in the game console as both software and hardware. As another embodiment of the instant invention, even though the system 1407 may reside in the system console, the system may also reside as one or more components distributed across a network and may be accessed across that network by the system console.

Other functionality 1413 related to the system 1407 (such as upgrade service handlers, hardware connection modules, and the like 1413) are noted.

Related to the system section 1407, is the user control advancements 1414 of the instant invention. The voice recognition aspects 1415, object addition 1416, team coordination 1417, and action addition capabilities 1418 and other elements 1419, such as object and action editors, fall into this section.

Related to the user control category 1414, is the feedback section 1420. The noise cancellation 1421, system attachments 1422 which include the air cannon, microphone, etc., and the camera and motion control items 1423, as well as other elements such as global positioning systems, maps and alarm components 1424 of the feedback system fall into this section.

Finally, the programming aspects 1425 of the system architecture include the perceptual angle of view software logic 1426, the multi-player program elements 1427 as well as other elements 1428 related to each of the previous sections such as guidance systems, network modules and the like.

Figure 15:
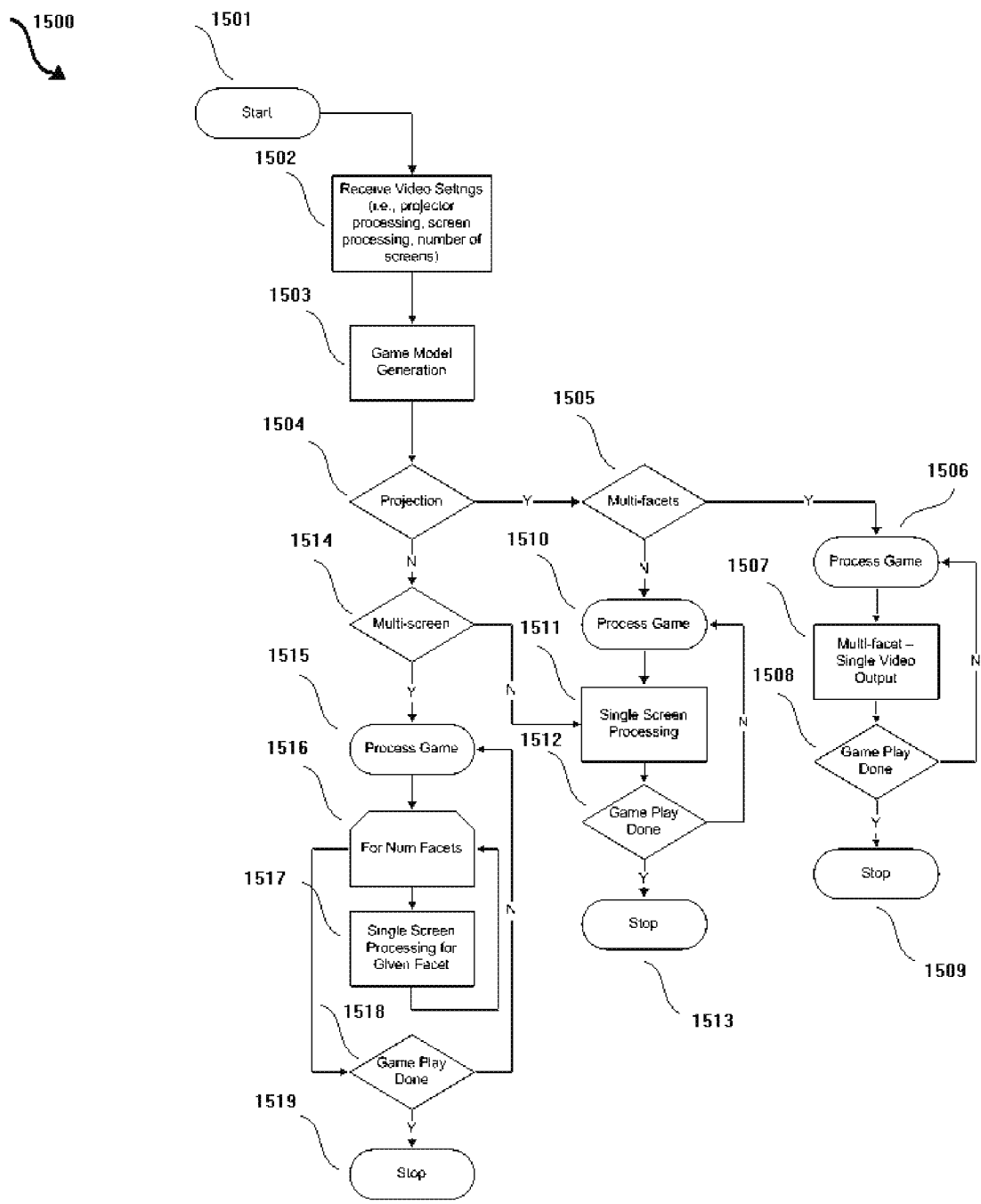
FIG. 15 shows the processing steps taken for the game program based on the screen.

Referring now to FIG. 15, 1500 represents the processing steps taken for the game program based on the screen type in which the game is projected or displayed. The game software used to process the logic needed to display one or more visual objects on the one or more screens resides in the game console and could produce the one or more images to display on one or more screens by determining the physical arrangement of the attached one or more screens or optical adapters described in the one or more alternate embodiments of the instant invention. In addition to the embodiment of the multi-screen logic game software residing within the local game console, this software could be located on a network node connected to the game system either through a wired or wireless connection.

A particular embodiment of the current invention could receive an indicator from the one or more display units, screens or projector and/or optical adapters to determine the number, dimensions and arrangement of the screens or one or more walls which could be available to present the one or more images to the one or more players.

For example, if the screen is a multi-screen or multi-faceted screen, different logic paths are taken than for a simple flat screen. In addition to this, logic is required to scale the capabilities of the system back for a single screen so that the multi-screen capabilities are not used when the one or more receiving display units may not be capable of receiving the data.

Images and game logic within the software of the game console could receive one or more video settings 1502 which dictate how the game software manages the output to the one or more facets and how the hardware receives the one or more facets and produces the output to the one or more displays. The one or more video settings 1502 are received by the model generation component 1503 which produce the image frames and sprite animations necessary for the given output channel.

If the output type is a projection 1504 where the image is transformed in a projection attachment, the image from the projection 1504 is passed to one of either the single facet game process option 1510 or the multi-facet game process option 1506. If the output type is not a projection 1504, the image data is passed to one of either the multi-screen process option 1516 or the single screen processing option 1511. If the image data is displayed using a projected image against a multi-facet receiver 1501, the output is generated for each facet and repeated while the game play indicator 1508 shows that the game is not done. As each facet is received, the process is repeated from 1506 to 1508 until the game finished indicator 1508 is done. At the point when the game done indicator 1508 is set, the process is stopped 1509.

If the output type is a projection 1504 but is not a multi-facet receiver or the output type is not a projection 1504 but a single screen output 1514, both output types are handled using the single screen processing receiver 1511. The output is generated using the single screen processing receiver 1511 and repeated while the game play indicator 1512 shows that the game is not done. As each image is received, the process is repeated from 1510 to 1512 until the game finished indicator 1512 is set. At the point when the game done indicator 1512 is set, the process is stopped 1513.

If the output type is an array of screens 1514 where the images are delivered as multiple facets 1516, each facet is delivered to an individual screen processor 1517 for that given facet. This is repeated for each facet 1516 where the game done setting 1518 is false. Once all of the facets for a single iteration have completed processing, the step is repeated from 1515 and then each facet in the iteration is processed from the facet counter 1516, using the single screen process receiver 1517 until the game play done indicator 1518 is set to true. Once the game play done indicator is set to true, the process is stopped 1519.

Figure 16:
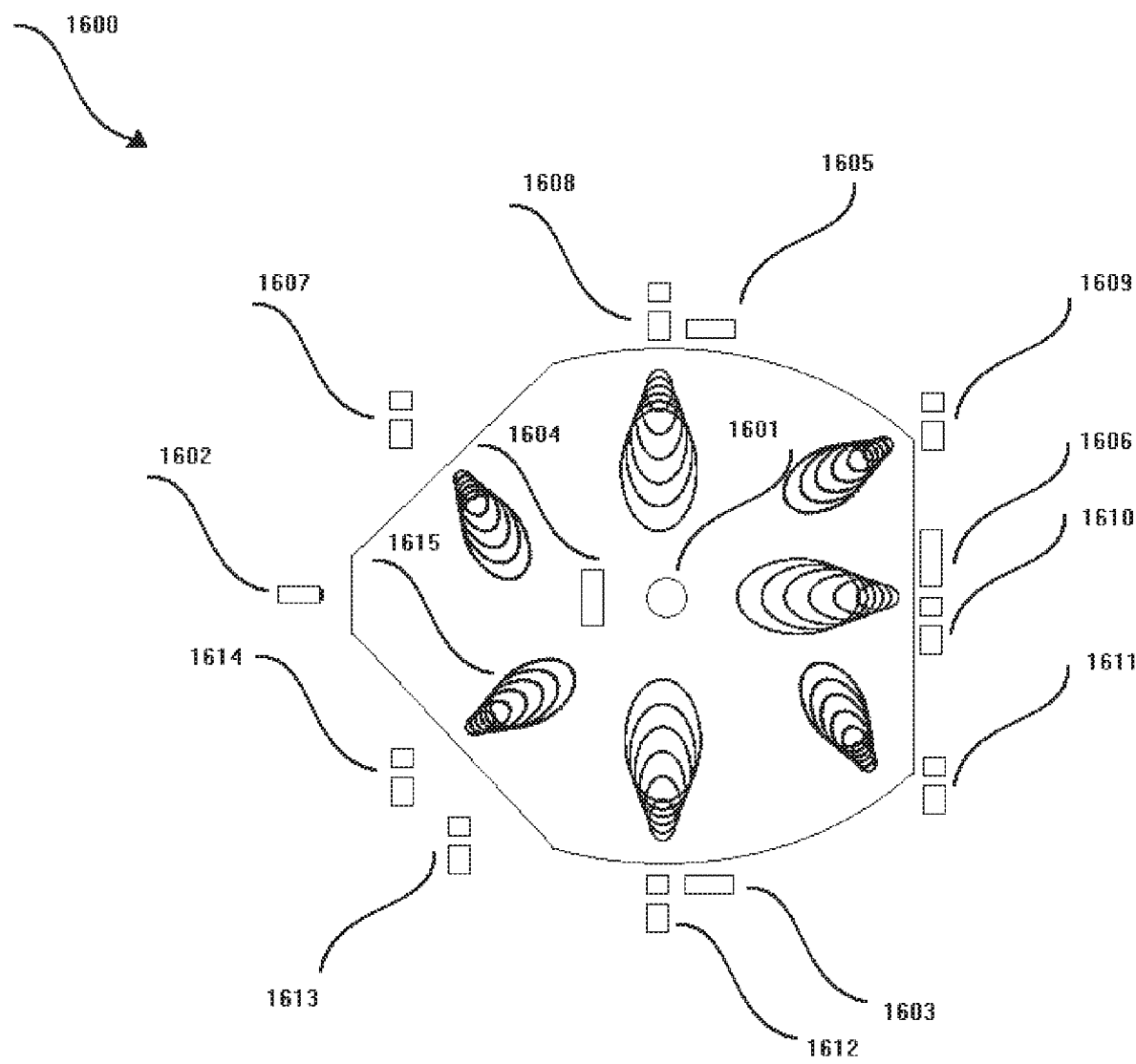
FIG. 16 shows an over-head representation of the advanced field of view projection system with the camera, speakers, feedback units and effective waveforms used to enhance the gameplay experience.

Referring now to FIG. 16, an over-head representation of the advanced field of view projection system 1600 with cameras, speakers, feedback units and effective waveforms used to enhance the gameplay experience is depicted. The player 1601 is shown in the center, but the player can be located any where in the room and the system 1600 can support as many players as desired.

The example embodiment of the current invention makes use of several advancements in technology in the system. As described previously, the projector 1602 transmits one or more images to the screen or walls as shown in FIG. 8 by the curved wall 801 or FIG. 9 by the overhead 901 and curved wall 902, which surrounds the one or more players 1601. Speakers and feedback systems 1607-1614 are noted in multiple positions surrounding the one or more players 1601 and distributed in this example as a surround sound system where 1613, by example only, denotes the sub-woofer and corresponding feedback unit. Recall the feedback system is shown in FIG. 10 of the present invention. The waveform signals 1615 surrounding the one or more players denote the responding air blasts from the air cannons, shown in FIG. 10 as reference number 1009, or sounds from the speaker system 1607-1614. Waveform signals may also be emitted from the one or more players 1601 and picked up by the one or more microphones as part of the feedback systems 1607-1614. Cameras 1603-1606 are used to track the one or more player motions, receive motion commands, detect target ranges, help in calculating trajectory pressure, and scan player information into the system. The camera 1604, by example only, is located above and just behind the player 1601 looking down. All devices, wired or wireless, are connected to a game console.

Figure 17:
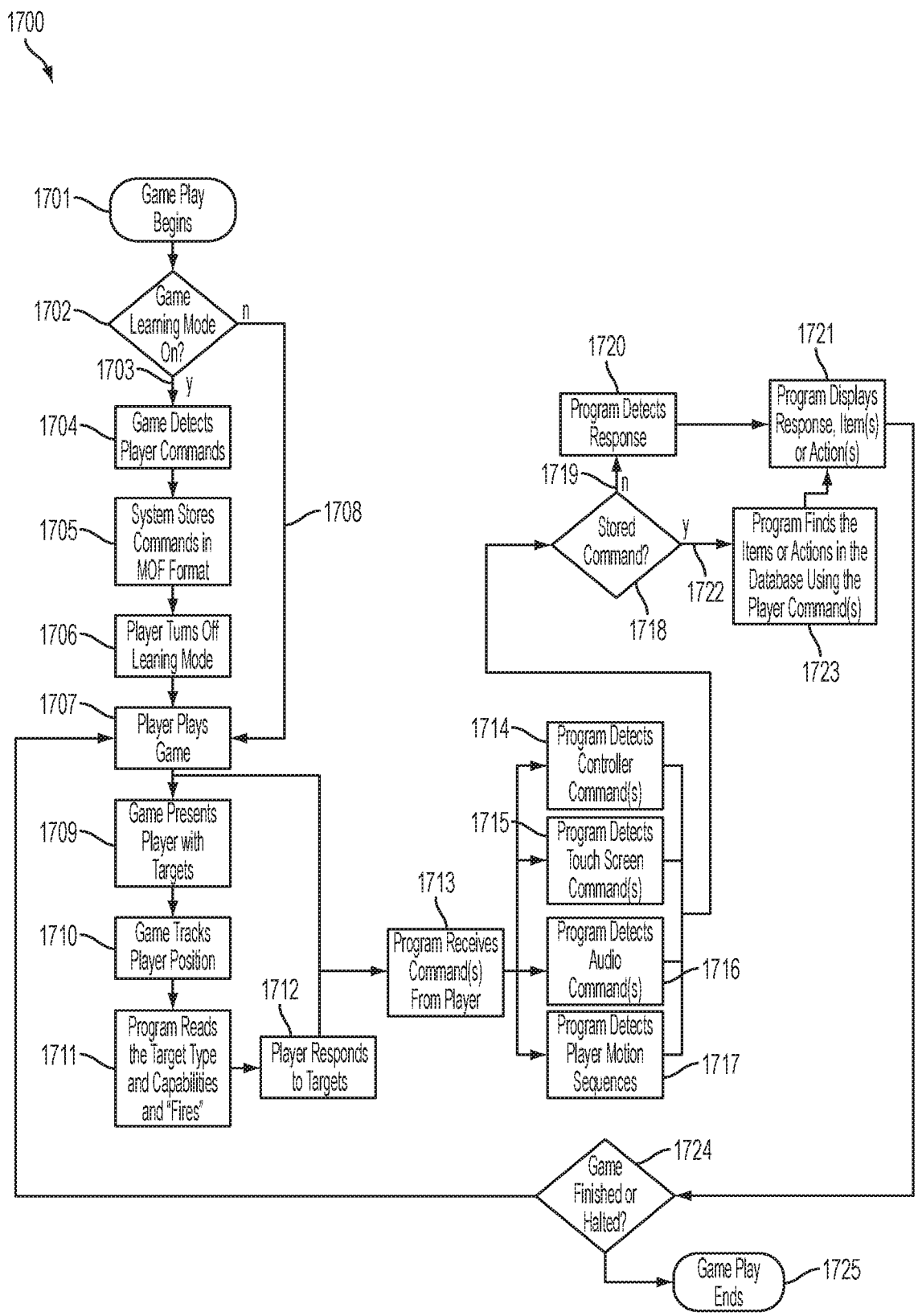
FIG. 17 represents the high-level process logic made in utilizing many of the aspects of the current invention.

FIG. 17 represents the high-level process logic made in utilizing many of the aspects of the current invention in a one or more player embodiment 1700. Gameplay begins 1701 where the option is made by the one or more players to either turn on the game learning mode or not 1702 by one or more motion instructions, or turned on automatically one the game starts. In the diagram, the one or more players are shown in the center of the play area, but one or more players can be any where in the room and can have as many players in the room as desired and can, again, be expanded by network connections to one or more other one or more player gameplay sessions.

The game software used to process the ability to add, remove and change certain aspects of the one or more motion or audio instructions as a portion of the learning mode of the game system may reside within the game console and could store and/or retrieve the one or more motion or audio instructions within the game console, but also could reside on a network node connected to the game system either through a wired or wireless connection.

Figure 18:
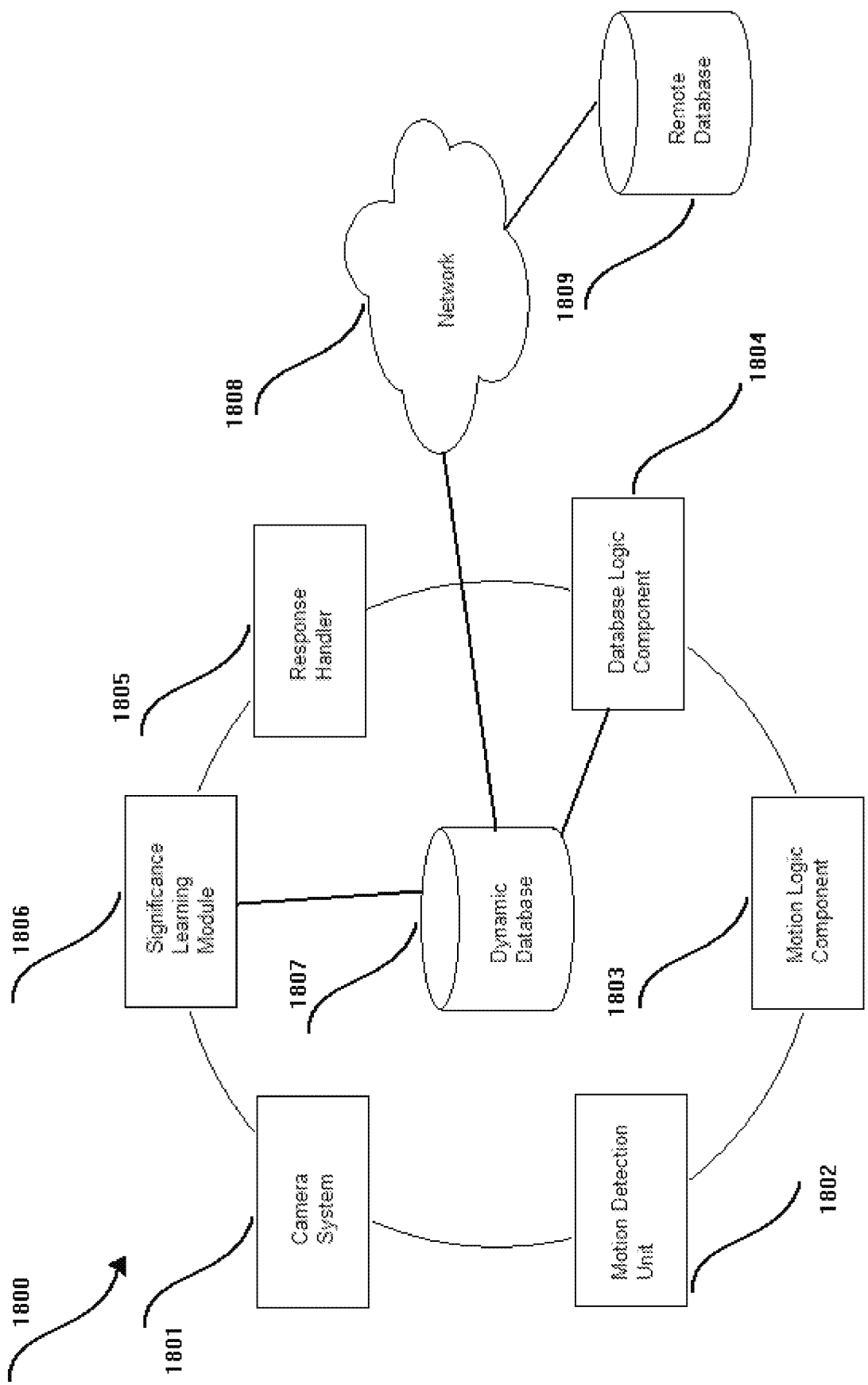
FIG. 18 represents the physical structure of the advanced gameplay system.

If the game learning mode 1702 is turned on 1703, the game software detects the player's motion or audio messages 1704 by use of the motion detection, camera and audio recording equipment described in FIG. 10 as a microphone 1021 referred to 1012, 1010 and 1021 and defines the specified motions as game commands by converting the one or more motions made by one or more players and comparing the one or more motions with existing motion instructions in the system storage unit which is connected to the game console or attached to the system over a network connection later described in FIG. 18 referring to number 1804, 1808 and 1807, as example only.

In the manner described, a motion instruction is added to the game system's storage unit by first having the game learning mode turned on. This is performed by either a predetermined, pre-stored motion instruction made by the player or an audio command. For example, by the player waving their hand in front of the screen, the motion detection unit senses the motion, the camera captures the motion, the game system receives the motion images and compares them to images stored in the system storage unit, performs a match on the data analyzed from the images and searches for a match. In this example, the match is made to turning the learning mode on in the system. Once the match is made, the game learning mode is switched on and the player can begin adding, editing or removing audio and motion instructions.

Alternatively, an audio command can also be issued by the player. This audio command is received by the game system microphone, matched against a storage unit of pre-recorded audio commands, and, if a match is found, performs the command. In this case, the command is to start the system's learning mode. Once the match is found, the learning mode begins and the player can begin to add, remove or edit motion instructions or audio commands.

Once the learning mode is on, the system repeatedly learns the physical movements of a player or group of players and provides on-screen lists, for example, of items, tasks, or other actions the player may wish the game system to produce or perform. In the example described in FIG. 11 and FIG. 12, the player makes a motion to hoist a bazooka and, even though the player may not physically have a bazooka in their possession, the bazooka appears and is hoisted by the avatar on the player's screen. In this example, the player makes a motion to hoist a gun. The player may stagger, as an example, due to the weight of the imaginary gun. Once the game system captures the motion, compares the information it receives from the motion, and either finds one or more matches, or none at all, it presents either the player's avatar performing the intended one or more commands or, for example, a list of possible one or more commands the player may be interested in having the avatar or system perform.

In addition to a single avatar performing one or more commands, the motion or audio commands could set off a series of one or more commands or reactions within one or more avatars, other players, objects as well as object, players, avatars, etc. which are not even appearing on the screen yet.

At the point where the player is presented with a list, for example, of choices for the related motion or audio instruction, the player can choose the resulting action, item, etc. from the list presented to them, or they can choose additional levels of detail which could provide them with many more choices, if desired. In this manner, a motion or audio instruction produces a motion result, where the motion result can be any of one or more actions, items or another motion/position change. For example, a single command or motion could be issued by one or more players to contact all teammates for a game session. The system, for example, could attempt to contact each teammate, by text, email, phone call, system notification, etc. to organize the gameplay and could satisfy the requirements for the game by substituting in virtual players until the real players joined.

Once the player makes a selection from the list, for example, the motion instruction may be reviewed so that the player can confirm the motion instruction and the motion instruction with the resulting motion result is stored in the system storage unit. This motion instruction can be made private, public or it can be stored in a collection or it can be sent to a server which can allow other players to purchase and/or download the associated motion instruction for their own game. The player also has the ability to make a motion instruction editable by another player or fixed so that players using the motion instruction could use the instruction for its original intent.

Motion instructions also have the ability to be modified by the one or more players and re-associated with other one or more motion results if the one or more players desire. To do this, the player could use a universal motion or audible instruction to open the motion instruction editor. They could then form the motion or audible command so that the system could retrieve the motion instruction and associated motion result from the storage unit, for example. At this point, the player could have the opportunity to either change the motion instruction and overwrite the existing one, delete it or copy it to another motion instruction. The player could also have the ability to modify, remove or change the motion result. Once the player has finished making their changes to the motion instruction, the motion instruction is stored in the game console storage unit.

In order to modify, add to or remove one or more existing motion or audible instructions, either in full or partial, the instruction must be either selected by the player from a list, for example. To do this, the player could review a list of instruction text or images on the screen and select one or more of them by using, for example, a series of one or more motions to select the one or more instructions. This could be done by hand motion, audible command, finger motion, touch screen, using a pen, or any other method. Once the one or more instructions have been selected, the player may choose one or more actions that can be taken upon the one or more instructions. In this case, these could include the modification or removal or one or more full or partial portions of one or more instructions. For example, in the case of the bazooka scenario, the player may want to add to the motion when they act like they are lifting a bazooka, they could immediately fire it at an opponent once it has been aimed and then the bazooka is put away because the player does not want to carry it around with them. In this case, the player would add the motion of aiming, firing and putting the bazooka away to the already existing instruction which shows the avatar lifting the bazooka when instructed to do so. In this manner, the player would have the ability to save over the existing instruction, create a new copy of one, as well as transmit it, for example, over the network, for other players to use it.

The game system of the current invention also provides range flexibility which allows the user to produce a motion instruction within a range of motions, motion speeds and direction and generalizes the motions it detects and associates with the storage unit the related motion result. In this manner, the player is not required to produce the motion instruction in the same position or orientation as the motion instruction was originally created; so there is no reason to memorize the exact position, orientation, speed and range of motion of the original motion instruction. This range flexibility covers the player being, in the case of the football scenario, a left-handed or right-handed thrower, their head being back or cocked in a certain direction, as well as many other positions and motions so that there are a large number of potential motions which fall into the range flexibility window however, these are not infinite. This being said, there are specific motions which could be as subtle as a glance or a turn, for example, by the player to "fake" a pass or a pass' direction, etc. and the player and system could be aware of these nuances so that the system can compensate for the differences required to retrieve the associated motion result from the game system's storage unit.

Restrictions, based on the game system, may also be in place where the player may not have what they want until a certain level has been achieved or a certain amount of virtual money is available to spend. This restriction is dictated by the game author and it tied to the array of potential items, actions, or motions available for the player to choose from. For example, a player may have just started a game and they want a super-cannon they could use to overwhelm their opponents. However, the game author has locked this item until a particular level by the player has been achieved.

The player has the opportunity to add, modify and remove these motion instructions stored or to be stored in the game console or remote server by associating the physical movements with the commands or actions in the game. These commands and motion sequences or audio messages 1704 are stored in the advanced meta-file object format 1705 in the system storage unit, shown in FIG. 13 as 1315, FIG. 18 as either 1807 or 1809, or FIG. 19 within the console 1907, the one or more servers 1907 or the console 1908. Further player motion sequences or audio messages 1704 are interpreted as the associated commands or actions by performing storage unit searches using signatures from the audio or command instructions and searching for comparative data which could result in a match against the given audio or command instruction in the game console or network storage unit.

When the player turns off the game learning mode 1706, either by an audio or motion command or when it automatically turns off, normal gameplay begins 1707.

If the game learning mode 1702 is not turned on 1708 by the one or more players, either by an audio or motion command, normal gameplay begins 1707. If audio or motion instructions are performed during gameplay and a match is not found in the system for the audio or motion command, then the motion or audio command is ignored by the system.

If the one or more audio or motion instructions are intended to have one or more responses by the system console, the game learning mode can be switched on by a given command and can be added to the game system storage unit at any time.

As gameplay progresses, the game software in the game console or received across the network to the game console, as an example only, either presents the one or more players with targets 1709 which can be fired upon or receives commands from the one or more players 1713. These targets are produced by the game software running on the game console. The one or more players can fire at the one or more targets by, as an example, moving their hands back and forth in a shooting motion. This shooting motion is interpreted by the game system as a motion instruction and, taking in consideration the angle and timings of the one or more motions, can hit or miss the targets and show the one or more results to the one or more players on the screen as they "fire" upon the one or more targets.

During the time that the game software presents the one or more targets to the one or more players 1709, the game software tracks the one or more players' positions 1710. If the one or more targets in this example have the ability to fire at the one or more players, the game software reads and analyzes the target type, its capabilities, and "fires" 1711 upon the one or more players using the one or more air cannons, for example, as depicted in FIG. 10 referring to number 1009 and/or other devices shown in FIG. 10 to simulate a gun or cannon, etc. firing on the one or more players in battle. The player, in turn, responds to the one or more target attacks 1712 by moving their hands at the targets in a shooting motion.

In the described example, the game software, stored in either a local or remote game console, either by disk, chip, drive, memory, etc., would be accessed to react to motion commands in a method similar to the following description. As a hypothetical, simplified example, five aircraft could be flying over the one or more player's heads. The aircraft may, for example, appear on the ceiling portion of the screen, as shown in FIG. 5 as 506 or FIG. 9 as 901. The aircraft could be shooting at the one or more players on the "ground" at, for example, 45 degree angles. Since the aircraft are moving at a certain velocity relative to the one or more players' velocities, the angles of each of the one or more players' devices, such as bazookas, aircraft, etc., must be considered in the mathematical calculation necessary to simulate a "hit" either by the approaching aircraft or the one or more players. In addition to the vertical and horizontal angles, multiple velocities of the one or more players, the velocities and capabilities of the one or more "guns", including their corresponding firepower and damage capabilities, the damage to and around units in the area must be considered, for example. In this way, a "hit" made by the one or more players on the approaching aircraft would be achieved if the angle of the aircraft, the aircraft speed, the player speed, angle of the projectile, and the speed of the one or more projectiles "meet", for example, at a particular point.

Regardless of how the game software receives the commands from the player 1713, the game software receives the commands either by a wired or wireless controller 1714, touch screen commands 1715, audio messages 1716 or motion sequences 1717 and attempts to interpret the command(s) as stored or not 1718.

If the command is not stored, it is considered a player move or other response 1720 and the game software displays the results of the actions 1721. For example, if a player is walking and they turn a corner, the avatar on the screen can perform the same motion, but this is simply done by the gameplay system monitoring and mimicking the player on the screen. This is not handled in the same way in the system as a player drawing back to throw a virtual football to an open wide receiver. Even though the avatar could walk through a city, for example, and certain three-dimensional graphical models of the city could be generated by the gameplay system, as well as the avatar looking like they are moving, it does not require a lookup in the gameplay storage unit to determine the motion result of a motion which instigates a new gameplay result, for example, the first time the player, as a quarterback in a game, receives and throws the football. Subsequent plays made by the player in the context of the game are expected to be playing as a quarterback until a new motion instruction is received by the system.

Other motions are ignored altogether. As an example, if the player has instructed the avatar to make a particular move which takes, for example, a few minutes, the player has the opportunity to get a drink of water. The motions made by the player to get a drink of water or to rest are not recorded in the system as a gameplay motion and these are, in essence, ignored by the system. In a scenario where a player is playing a football game, for example, the player could snap the ball and throw it to a receiver. Once the ball has been thrown by the quarterback, the players' motions could be ignored by the system as control is now given to the other players which include a potential receiver and potential tacklers. If the receiver catches the ball and gets tackled and the gameplay ends for the given down, the motion of the other players can be ignored. In addition, in this scenario, the receiving player, if real, can be virtually tackled by a player remotely located and connected to the game through a network connection. In the case when this takes place, the player playing as the receiver may still be standing in their room, but their avatar on the screen is lying on the ground with several tacklers on top of him. This picture is shown on the screens of all players (and/or observers of the gameplay).

There is also a point where the game software derives a random outcome and advances play in the direction of that outcome. At this point, all motion made by other real players is ignored by the system and picked up again when a motion instruction or other interactive play segment begins.

There could also be times during gameplay where a slight variation of a "known" move is made by one or more players. In this case, the system may ask the one or more players what they are intending to do and may present the ability for the one or more players to attach a motion result to the suspected motion instruction or to ignore the instruction. If they wish to add the move to the system as a new or appended motion instruction, they may have the ability to do this and it may be stored in the game system storage unit. If the one or more players notify the game system that the move was really an already existing motion instruction, for example, the one or more players may have the opportunity to connect the move to an already existing one or more motion instructions so that the game system may interpret both of the moves as a single motion instruction. In this manner, the system may have the ability to characterize particular motions and when a motion lies outside of the range of these characteristics, the player may have the opportunity to notify the game system of their intent.

For example, a player playing as a quarterback in a football game could be trying to fake a thrown to a receiver by dropping the ball behind them before throwing it and then catching it with their other hand and tossing it to another player. Since the real player does not necessarily have a ball, the system could determine that their left hand, for example, is being placed behind their back in a very unusual position. At this point, the game system could determine that the motion is new by receiving the motion data from the camera and motion detector, comparing the motion data with the system's storage unit, checking if the motion data already exists in the system. If the system does not find this set of moves within the storage unit, it could prompt the one or more players on the screen if this is a special move. If it is, the player could perform many tasks or simply ignore the prompt. For example, the player could agree that this is a new motion instruction. In this case, the player would see the prompt on the screen, for example, and react to it by performing an audio of motion instruction. In this way, the system could, for example, receive the instruction and show a series on one or more menu items on the screen. The one or more menu items could be answered by the one or more players on the screen. In this case, this new move could be given a name, posted to the one or more players' storage units as well as shared over the network and stored in a storage unit which could be accessed by other players or another one or more players storage units, such as a team.

Again, in the described example, the motion instruction could be stored and shared by the one or more players publicly or privately among themselves for their team to utilize.

Beyond this, the subsequent motions, such as tossing the ball to the left or the right to another player could be captured and handled accordingly instead of throwing the ball as normal.

If the command is stored 1722 and found by the console software comparing the one or more player audio or motion command signatures to the one or more motion instruction records stored in the system storage unit, the game software retrieves the one or more items or enables the actions' capabilities associated with the stored command 1723 signature which is found in the database (storage unit). The result is presented to the player on the display unit 1721 by either presenting the item associated with the audio or motion instruction or by showing the avatar on the screen producing the movement associated with the audio or motion instruction found in the database record.

If the gameplay is finished 1724, the gameplay ends 1725, otherwise, it continues 1707.

The processes used to relate the motion instructions to the resulting items or commands in the game system are described in FIG. 18 where a motion instruction is captured by the camera system 1801, transforming the motion into a motion sequence, sending the motion sequence to the motion detection unit 1802. The motion detection unit 1802 converts the motion sequence into one or more motion packets, transforming the motion packets into edge points, sending the edge points to the motion logic component 1803. The motion logic component 1803 receiving the edge points, forming a database query made up of the edge points, sending the database query to the database logic component 1804 where the database query is run against the database 1807, the database logic component 1804 receiving the query results from the database 1807, sending the results to the response handler 1805. The response handler 1805, receiving the results of the database query from the database logic component 1804, either prompts the player for more information, receiving the one or more responses from the player and/or sending the results of the motion instruction and/or the results of the player prompts to the significance learning module 1806. The significance learning module, receiving the information from the response handler 1805, stores the motion instruction and result in the database 1807.

In addition, each of the nodes described in FIG. 18 could be located in a single or multiple nodes, each of these being located either locally within the game system or outside of the game system on a network device, disk, chip, etc. over a wired or wireless connection.

At any time, the player may ask the system to store or retrieve additional motion instructions and/or updates from a network 1808 which is connected to a remote database 1809 which may include connections from many other players having the same ability to store and retrieve motion instructions and/or updates. The system can include a set of motion or audio instructions and can be updated from a server based on the universal instruction lists as well as motion instructions for a particular game the player has purchased. These updates can be made by system developers and may also be made by other players. In this manner, motion or audible instructions are not limited to players or system developers. The associated audio or motion instructions could be provided, for example, by professional quarterbacks. These could be uploaded, as an example, to a remote server and made available to players. Motion instructions which may appear to override custom motion instructions that the player has already produced on their system may result in a prompt which the player can answer. These updates can happen when the player first starts the system or in the background so that gameplay is not interrupted. Players can also choose to have the system overwrite any potential conflicting motion instructions with the updates if they wish.

Likewise, in the same way that motion instructions are continually updated, the models for allowable ranges of motion is continually updated. So as range models improve over use and time, the details to these models are also updated in the player systems to improve the player's experiences. For example, if an improvement is made in a lateral snap where the quarterback can hide the ball for a second and toss it to a receiver, the original models for this may be crude or missing from the system so that the motion result is not available to the player for them to choose, then an update to the system could provide the system with the motion result the player wished to associate with the motion instruction in the first place.

Figure 19:
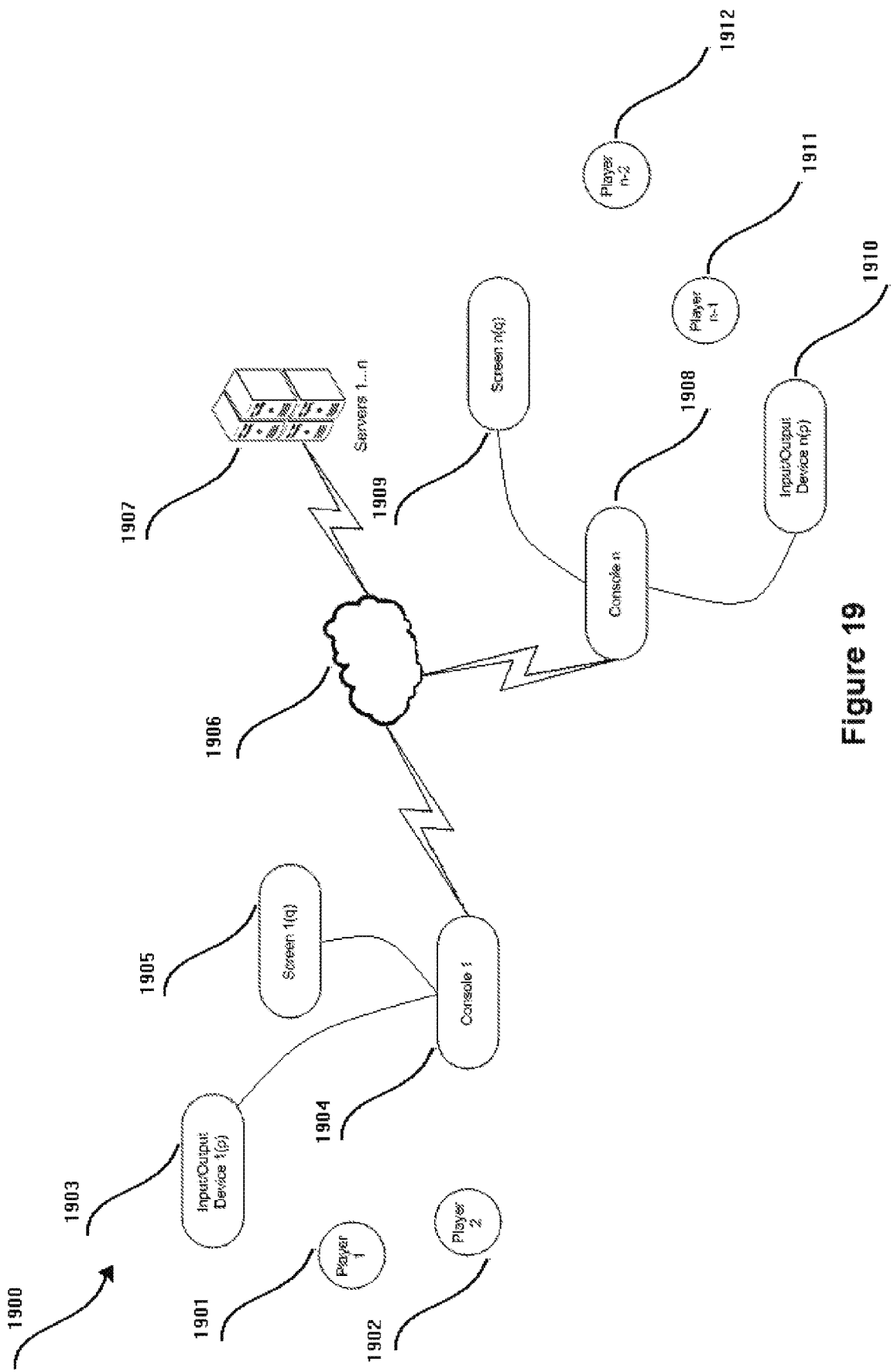
FIG. 19 represents an example network architecture of the advanced gameplay system.

Referring now to FIG. 19, gaming system 1900 includes multiple players, represented as the players 1901 and 1902 receiving and sending information to and from the input/output device 1903 connected to the console 1904 connected to a screen 1905 and a network 1906 where information can be shared, retrieved or stored at the server 1907.

In addition to the above, multiple players represented as player 1911 and player 1912 send and receive input from the input/output device 1910 connected to a console 1908 and a screen 1909 and a network 1906 where information can be shared, retrieved or stored at the server 1907 as well as interact with multiple players 1901 and 1902 across the network. Likewise, players 1901 and 1902 can interact through the input/output device 1903 with players 1911 and 1912 using their input/output device 1910.

In this scenario, if the players 1901, 1902, 1911 and 1912 are playing together in the same game, the screen interactions, avatars of the associated players, including the motion instructions for multiple players 1901 and 1902 could appear on the screen 1909 across the network for the multiple players 1911 and 1912 to view and interact with, and the avatars of the other players 1911 and 1912, as well as the motion instructions, could appear on the screen 1905 which is viewed by players 1901 and 1902.

Furthermore, in addition to the described scenarios resulting in a collection of one or more motion or audible instruction sets, the player could designate the collection as a playbook. The playbook could belong to a team, real or virtual, for example, and could have private or public characteristics associated with it. The playbook could be made up of motion instructions and audible instructions. The audible instructions could be configured by the player to be heard, for example, by teammates, but not by opponents.

For example, if the team is in a huddle and the quarterback is speaking to the players, the players on the side of the avatar speaking the commands could hear the information, while the opponents might not. The audio level of the quarterback also varies by their loudness level and the direction in which they are speaking. For example, the audio information from the quarterback in the huddle could not be heard by the opposing team members but the commands screamed by the quarterback on the line of scrimmage could be heard by both player team members but it might by muffled by the crowd or because the quarterback is shouting in the opposite direction. The parameters required for the audible commands to be public or private, for example, could be stored with the audible commands so that, when the commands are retrieved, the system would know that only certain speakers for certain players, for example, would play the corresponding sound are that the volume levels would be different on the corresponding speakers so that they would mimic the player's position, audio level, intent, etc.

Likewise, the same could be stated pertaining to the coaches and their signals to their players, other coaches, etc. Quarterbacks, for example, could hear their coaches, but not the opposing coaches as well as determining their hand signals, etc.

The present invention also lends itself to advertising around this technology as well as selling virtual seating, using virtual currency or otherwise, where fans could purchase a seat to get a particular angle on the game. The better price paid for the seat, the better the angle and audio quality is presented to them by the system. Player's could also open up private data such as playbooks and audio commands to particular observers if they desire.

Furthermore, the present invention incentives to become early adopters to the technology is large due to the ability to promote the particular motion information creator's name or brand so that later adopters have the luxury of making use of the existing motion information that the early adopters created.

Figure 20:
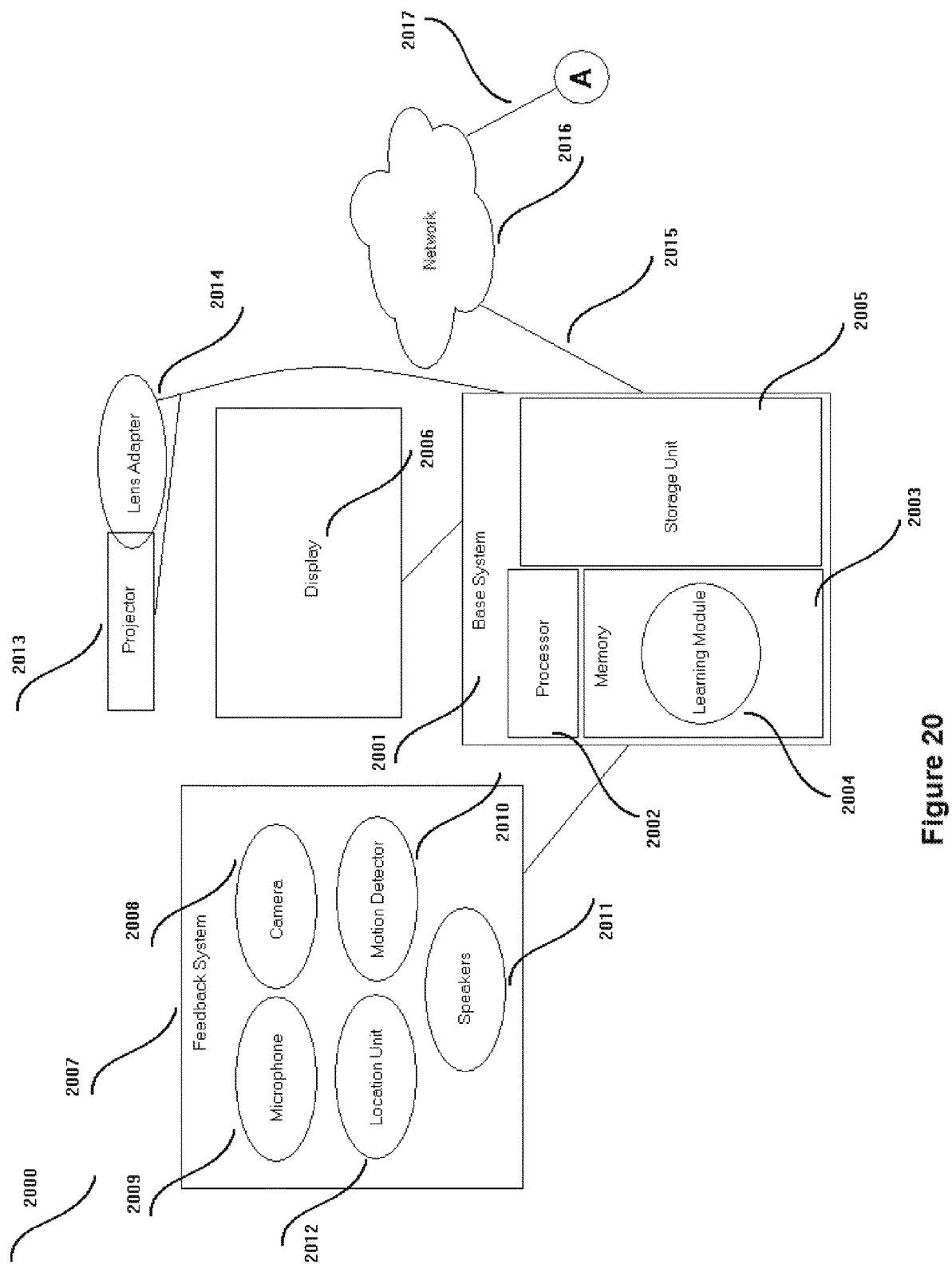
FIG. 20 represents the first of two parts of an alternate embodiment of the physical structure of the advanced gameplay system.
Figure 21:
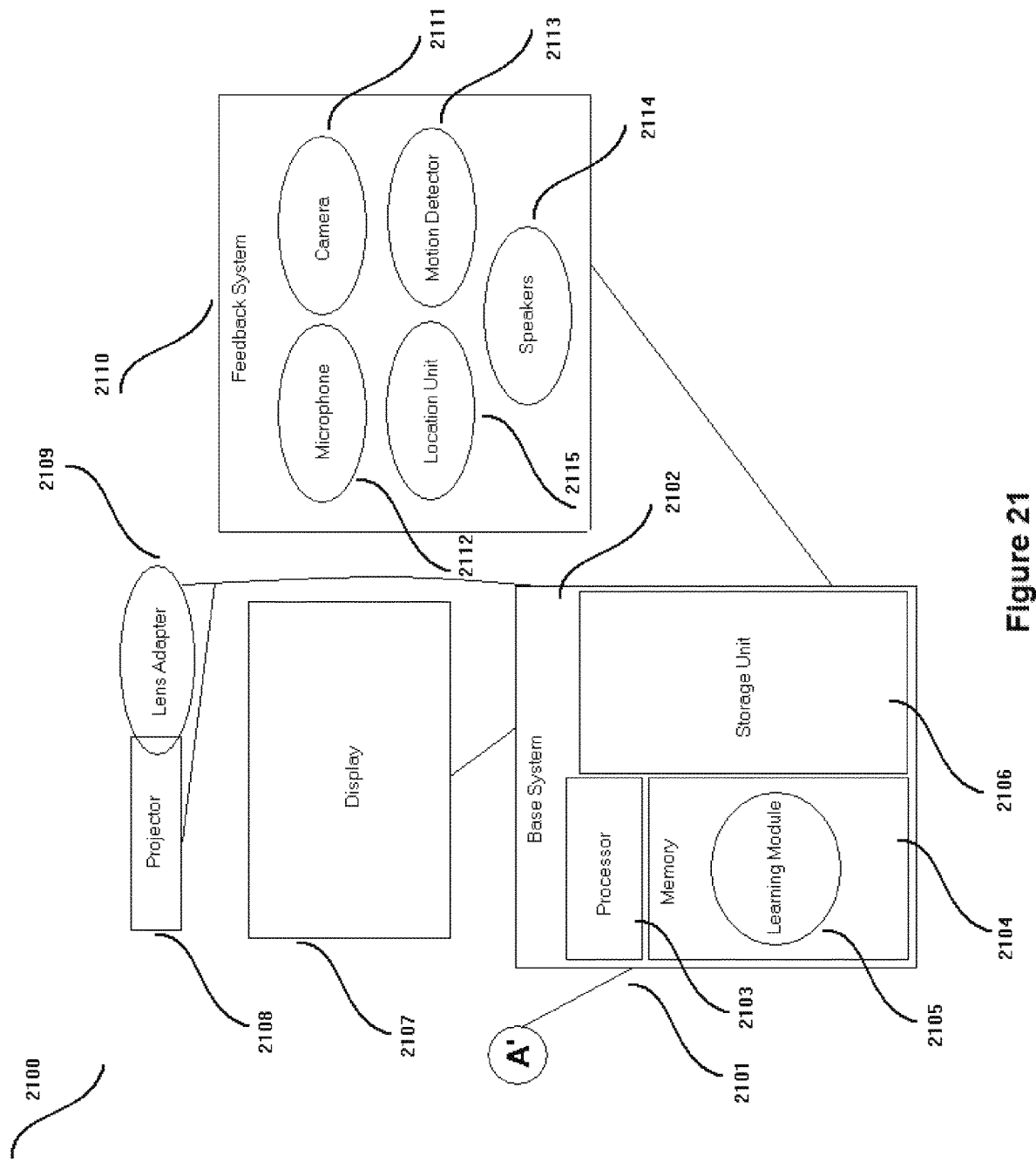
FIG. 21 represents the second of two parts of an alternate embodiment of the physical structure of the advanced gameplay system.

Referring now to FIG. 20 and FIG. 21, gaming system 2000 and 2100 show an example of the multiple physical connections of the present invention including the base unit 2001 which includes at least one processor 2002 and at least one memory 2003 having at least one learning module 2004 and at least one storage unit 2005 connected to at least one feedback system 2007, having at least one camera 2008, microphone 2009, and optionally one or more motion detectors 2010, speakers 2011 and location units 2012, and at least one display 2006, alternatively, a projector 2013 optionally having a lens adapter 2014 or multiple projectors 2013 without a lens adapter 2014. The gaming system 2000 optionally connected by a connection 2015 to a wired or wireless network 2016 via connector A, connected to FIG. 21 using connector A' connected using a connection 2101 to at least one base system 2102 which includes at least one processor 2103 and at least one memory 2104 having at least one learning module 2105 and at least one storage unit 2106 connected to at least one feedback system 2110, having at least one camera 2111, microphone 2112, and optionally one or more motion detectors 2113, speakers 2114 and location units 2115, and at least one display 2107, alternatively, a projector 2108 optionally having a lens adapter 2109 or multiple projectors 2108 without a lens adapter 2109.

In one embodiment, a controller-less gaming system comprises a base system including at least one processor and memory, and a learning module, a feedback system including at least one: camera, microphone, and motion detector, wherein the feedback system is communicatively coupled to the base system, a display communicatively coupled to the base system, and a storage unit communicatively coupled to the base system, wherein the feedback system receives input from at least one of the camera, the microphone, and the motion detector, and sends the input to the base system, wherein the base system compares the input to other input in the storage unit and if the comparison produces a non-satisfactory result: the base system chooses a closest result to the input if the closest result is above or equal to a threshold and displays the closest result or the base system chooses a default result to the input if the closest result is below the threshold and displays the default result, and if the closest result or the default result is not an intended result, the base system receives an adjusted input from the feedback system and displays a result of the adjusted input on the display. The input and the other input include at least one of: angles of a body and body part, movement of the body and the body part, direction of the body and the body part, speed of the body and the body part, audio from the body or the body part, biometric information the body or the body part, items attached to the body or the body part, or items supporting the body or the body part.

The base system stores the adjusted input result as another one of the closest result in the storage unit, displays the closest result when it receives another adjusted input result without an adjusted input from the feedback system, displays the closest result and the adjusted input result and provides an intended action associated with the closest result and an intended action associated with the adjusted input result. The base system is communicatively coupled to at least one of: a plurality of network connections, a remote storage unit, a projection system, a projection system using a lens adapter, a feedback system, a feedback system using one or a plurality of speakers, a feedback system having a location unit, a base system, a display, a curved display, a curved display with an overhead component, a wired display, a wireless display, a local display, a remote display, a wired connection, a wireless connection, an air cannon or a storage unit.

At least one person (which may be a player or a spectator or both at varying times during the game) is present locally with the base system or present remotely from the base system.

The current invention provides a number of solutions including: A controller-less gaming system, comprising: a base system including at least one processor and memory, and a learning module; a feedback system including at least one: camera, microphone, and motion detector, wherein the feedback system is communicatively coupled to the base system; a display communicatively coupled to the base system; and a storage unit communicatively coupled to the base system; wherein the feedback system receives input from at least one of the camera, the microphone, and the motion detector, and sends the input to the base system; wherein the base system compares the input to other input in the storage unit and if the comparison produces a non-satisfactory result: the base system chooses a closest result to the input if the closest result is above or equal to a threshold and displays the closest result; or the base system chooses a default result to the input if the closest result is below the threshold and displays the default result; and if the closest result or the default result is not an intended result, the base system receives an adjusted input from the feedback system and displays a result of the adjusted input on the display. The base system stores the adjusted input result as another one of the closest result in the storage unit, the base system displays the closest result when it receives another adjusted input result without an adjusted input from the feedback system, the base system displays the closest result and the adjusted input result and provides an intended action associated with the closest result and an intended action associated with the adjusted input result, the base system is communicatively coupled to at least one of: a plurality of network connections; a remote storage unit; a projection system; a projection system using a lens adapter; a feedback system; a feedback system using one or a plurality of speakers; a feedback system having a location unit; a base system; a display; a curved display; a curved display with an overhead component; a wired display; a wireless display; a local display; a remote display; a wired connection; a wireless connection; an air cannon; or a storage unit. At least one person is: present locally with the base system; or present remotely from the base system. The input and the other input include at least one of: angles of a body or a body part; movement of the body or the body part; direction of the body or the body part; speed of the body or the body part; audio from the body or the body part; biometric information the body or the body part; items attached to the body or the body part; or items supporting the body or the body part.

The invention claimed is:

1. A method of interacting with a gaming device, the method comprising:
   detecting, via a detector device, at least one input by a user of the gaming device, the at least one input corresponding to at least one input instruction to control the gaming device;
   identifying, by at least one processor, an input instruction based on a match between the at least one input and at least one of a plurality of predetermined input instructions; and
   controlling, based on the identified input instruction, the gaming device to perform at least one of adding, editing and removing an audio user instruction or a motion user instruction, wherein the adding the motion user instruction further includes:
   adding an instruction to cause the gaming device to contact one or more teammates of the user to organize a gaming session and to substitute virtual players into the gaming session until the one or more teammates join the gaming session.

2. The method of claim 1, comprising initiating a game learning mode via the at least one input instruction.

3. The method of claim 1, wherein the detecting the at least one input comprises detecting the at least one input using at least one of a motion sensor, camera and microphone.

4. The method of claim 1, wherein the detecting the at least one input by a user further comprises detecting a motion of a hand of the user.

5. The method of claim 1, wherein the identifying the input instruction further comprises:
   producing an image of the at least one input; and
   comparing the image of the at least one input to a plurality of predetermined images corresponding to the plurality of predetermined input instructions.

6. The method of claim 2, wherein the initiating a game learning mode comprises initiating a game learning mode based on at least one of a body movement instruction and a voice input instruction.

7. The method of claim 1, wherein the identifying the input instruction comprises:
   producing an audio command from the at least one input; and
   comparing the audio command to a plurality of predetermined audio commands stored in the memory.

8. A gaming system, comprising:
   a memory;
   a processor; and
   a detector device configured to detect at least one input by a user of the gaming system, the at least one input corresponding to at least one input instruction;
   wherein the processor is configured to:

identify an input instruction based on a match between the at least one input and at least one of a plurality of predetermined input instructions, and wherein the processor is further configured to:

control, based on the identified input instruction, the gaming system to perform at least one of adding, editing and removing an audio user instruction or a motion user instruction, wherein, when the processor is to add the motion user instruction, the processor further is to:

add an instruction to cause the gaming system to contact one or more teammates of the user to organize a gaming session and to substitute virtual players into the gaming session until the one or more teammates join the gaming session.

9. The gaming system of claim 8, wherein the at least one input comprises at least one of a body movement instruction and a voice input instruction.

10. The gaming system of claim 8, wherein the detector device is at least one of a motion sensor, camera and microphone.

11. The gaming system of claim 8, wherein the at least one input is a motion of a hand of the user.

12. The gaming system of claim 8, wherein, when the processor is configured to identify the input instruction, the processor is further configured to:

produce an image of the at least one input; and compare the image of the at least one input to a plurality of predetermined images corresponding to the plurality of predetermined input instructions.

13. The gaming system of claim 8, wherein the processor is configured to initiate a game learning mode via the at least one input instruction.

14. The gaming system of claim 8, wherein the at least one input is an audio command, and wherein the processor is further configured to compare the audio command to a plurality of predetermined audio commands stored in the memory.

15. A non-transitory computer readable storage medium comprising instructions that when executed by a processor, cause the processor to perform:

detecting, via a detector device, at least one input by a user of the gaming device, the at least one input corresponding to at least one input instruction to control the gaming device;

identifying an input instruction based on a match between the at least one input and at least one of a plurality of predetermined input instructions; and controlling, based on the identified input instruction, the gaming device to perform at least one of adding, editing and removing an audio user instruction or a motion user instruction, wherein the adding the motion user instruction further includes:

adding an instruction to cause the gaming device to contact one or more teammates of the user to organize a gaming session and to substitute virtual players into the gaming session until the one or more teammates join the gaming session.

16. The non-transitory computer readable storage medium of claim 15, further comprising instructions that when executed by the processor cause the processor to perform initiating a game learning mode via the at least one input instruction.

17. The non-transitory computer readable storage medium of claim 15, wherein the detecting the at least one further input instruction comprises detecting the at least one input using at least one of a motion sensor, camera and microphone.

18. The non-transitory computer readable storage medium of claim 15, wherein the at least one input by a user comprises a motion of a hand of the user.

19. The non-transitory computer readable storage medium of claim 15, wherein the identifying the input instruction further comprises:

producing an image of the at least one input; and comparing an image of the at least one input to a plurality of predetermined images corresponding to the plurality of predetermined input instructions.

20. The non-transitory computer readable storage medium of claim 16, wherein the initiating a game learning mode comprises initiating a game learning mode based on at least one of a body movement instruction and a voice input instruction.

* * * * *